US009053102B2

(12) United States Patent
Adams et al.

(10) Patent No.: US 9,053,102 B2
(45) Date of Patent: Jun. 9, 2015

(54) GENERATION OF SYNTHETIC CONTEXT FRAMEWORKS FOR DIMENSIONALLY CONSTRAINED HIERARCHICAL SYNTHETIC CONTEXT-BASED OBJECTS

(71) Applicant: INTERNATIONAL BUSINESS MACHINES CORPORATION, Armonk, NY (US)

(72) Inventors: Samuel S. Adams, Rutherfordton, NC (US); Robert R. Friedlander, Southbury, CT (US); James R. Kraemer, Santa Fe, NM (US); Jeb R. Linton, Manassas, VA (US)

(73) Assignee: International Business Machines Corporation, Armonk, NY (US)

( * ) Notice: Subject to any disclaimer, the term of this patent is extended or adjusted under 35 U.S.C. 154(b) by 264 days.

(21) Appl. No.: 13/755,987

(22) Filed: Jan. 31, 2013

(65) Prior Publication Data
US 2014/0214871 A1  Jul. 31, 2014

(51) Int. Cl.
*G06F 17/30* (2006.01)

(52) U.S. Cl.
CPC ................. *G06F 17/30011* (2013.01)

(58) Field of Classification Search
CPC ............ G06F 17/30011; G06F 17/30528; G06F 17/30737
USPC ............. 707/705, 737, 756, 758; 704/9, 10
See application file for complete search history.

(56) References Cited

U.S. PATENT DOCUMENTS 5,450,535 A  9/1995  North
5,664,179 A  9/1997  Tucker
(Continued)

FOREIGN PATENT DOCUMENTS

EP  1566752 A2  8/2005
EP  1843259 A2  10/2007
(Continued)

OTHER PUBLICATIONS

"Ninth New Collegiate Dictionary", Merriam-Webster Inc., 1991, pp. 77 and 242.
(Continued)

*Primary Examiner* — Hares Jami
(74) *Attorney, Agent, or Firm* — John R. Pivnichny; Law Office of Jim Boice

(57) ABSTRACT

A processor-implemented method, system, and/or computer program product derives and utilizes a context object to generate a synthetic context-based object. A context object for a non-contextual data object is derived by contextually searching a document that contains multiple instances of the non-contextual data object. The non-contextual data object is associated with the derived context object to define a synthetic context-based object, where the non-contextual data object ambiguously relates to multiple subject-matters, and where the context object provides a context that identifies a specific subject-matter, from the multiple subject-matters, of the non-contextual data object. The synthetic context-based object is then associated with at least one specific data store, which includes data that is associated with data contained in the non-contextual data object and the context object. A dimensionally constrained hierarchical synthetic context-based object library for multiple synthetic context-based objects is then constructed for handling requests for data stores.

20 Claims, 12 Drawing Sheets

(56) References Cited

U.S. PATENT DOCUMENTS

| | | | |
|---|---|---|---|
| 5,689,620 A | 11/1997 | Kopec et al. |
| 5,701,460 A | 12/1997 | Kaplan et al. |
| 5,943,663 A | 8/1999 | Mouradian |
| 5,974,427 A | 10/1999 | Reiter |
| 6,199,064 B1 | 3/2001 | Schindler |
| 6,275,833 B1 | 8/2001 | Nakamura et al. |
| 6,314,555 B1 | 11/2001 | Ndumu et al. |
| 6,405,162 B1 | 6/2002 | Segond et al. |
| 6,553,371 B2 | 4/2003 | Gutierrez-Rivas et al. |
| 6,633,868 B1 | 10/2003 | Min et al. |
| 6,768,986 B2 | 7/2004 | Cras et al. |
| 7,058,628 B1 | 6/2006 | Page |
| 7,337,174 B1 | 2/2008 | Craig |
| 7,441,264 B2 | 10/2008 | Himmel et al. |
| 7,523,118 B2 | 4/2009 | Friedlander et al. |
| 7,523,123 B2 | 4/2009 | Yang et al. |
| 7,571,163 B2 | 8/2009 | Trask |
| 7,702,605 B2 | 4/2010 | Friedlander et al. |
| 7,748,036 B2 | 6/2010 | Speirs, III et al. |
| 7,752,154 B2 | 7/2010 | Friedlander et al. |
| 7,778,955 B2 | 8/2010 | Kuji |
| 7,783,586 B2 | 8/2010 | Friedlander et al. |
| 7,788,202 B2 | 8/2010 | Friedlander et al. |
| 7,788,203 B2 | 8/2010 | Friedlander et al. |
| 7,792,774 B2 | 9/2010 | Friedlander et al. |
| 7,792,776 B2 | 9/2010 | Friedlander et al. |
| 7,792,783 B2 | 9/2010 | Friedlander et al. |
| 7,797,319 B2 | 9/2010 | Piedmonte |
| 7,805,390 B2 | 9/2010 | Friedlander et al. |
| 7,805,391 B2 | 9/2010 | Friedlander et al. |
| 7,809,660 B2 | 10/2010 | Friedlander et al. |
| 7,853,611 B2 | 12/2010 | Friedlander et al. |
| 7,870,113 B2 | 1/2011 | Gruenwald |
| 7,877,682 B2 | 1/2011 | Aegerter |
| 7,925,610 B2 | 4/2011 | Elbaz et al. |
| 7,930,262 B2 | 4/2011 | Friedlander et al. |
| 7,940,959 B2 | 5/2011 | Rubenstein |
| 7,953,686 B2 | 5/2011 | Friedlander et al. |
| 7,970,759 B2 | 6/2011 | Friedlander et al. |
| 7,996,393 B1 | 8/2011 | Nanno et al. |
| 8,032,508 B2 | 10/2011 | Martinez et al. |
| 8,046,358 B2 | 10/2011 | Thattil |
| 8,055,603 B2 | 11/2011 | Angell et al. |
| 8,069,188 B2 | 11/2011 | Larson et al. |
| 8,086,614 B2 | 12/2011 | Novy |
| 8,145,582 B2 | 3/2012 | Angell et al. |
| 8,150,882 B2 | 4/2012 | Meek et al. |
| 8,155,382 B2 | 4/2012 | Rubenstein |
| 8,199,982 B2 | 6/2012 | Fueyo et al. |
| 8,234,285 B1 | 7/2012 | Cohen |
| 8,250,581 B1 | 8/2012 | Blanding et al. |
| 8,341,626 B1 | 12/2012 | Gardner et al. |
| 8,447,273 B1 | 5/2013 | Friedlander et al. |
| 8,457,355 B2 | 6/2013 | Brown et al. |
| 8,620,958 B1 | 12/2013 | Adams et al. |
| 2002/0111792 A1 | 8/2002 | Cherny |
| 2002/0184401 A1 | 12/2002 | Kadel et al. |
| 2003/0065626 A1 | 4/2003 | Allen |
| 2003/0088576 A1 | 5/2003 | Hattori et al. |
| 2003/0149562 A1 | 8/2003 | Walther |
| 2004/0111410 A1 | 6/2004 | Burgoon et al. |
| 2004/0153461 A1 | 8/2004 | Brown et al. |
| 2004/0162838 A1 | 8/2004 | Murayama et al. |
| 2004/0249789 A1 | 12/2004 | Kapoor et al. |
| 2005/0050030 A1 | 3/2005 | Gudbjartsson et al. |
| 2005/0165866 A1 | 7/2005 | Bohannon et al. |
| 2005/0273730 A1 | 12/2005 | Card et al. |
| 2006/0004851 A1 | 1/2006 | Gold et al. |
| 2006/0036568 A1 | 2/2006 | Moore et al. |
| 2006/0190195 A1 | 8/2006 | Watanabe et al. |
| 2006/0197762 A1 | 9/2006 | Smith et al. |
| 2006/0256010 A1 | 11/2006 | Tanygin et al. |
| 2006/0271586 A1 | 11/2006 | Federighi et al. |
| 2006/0290697 A1 | 12/2006 | Madden et al. |
| 2007/0006321 A1 | 1/2007 | Bantz et al. |
| 2007/0016614 A1 | 1/2007 | Novy |
| 2007/0073734 A1 | 3/2007 | Doan et al. |
| 2007/0079356 A1 | 4/2007 | Grinstein |
| 2007/0136048 A1 | 6/2007 | Richardson-Bunbury et al. |
| 2007/0185850 A1 | 8/2007 | Walters et al. |
| 2007/0282916 A1 | 12/2007 | Albahari et al. |
| 2007/0300077 A1 | 12/2007 | Mani et al. |
| 2008/0065655 A1 | 3/2008 | Chakravarthy et al. |
| 2008/0066175 A1 | 3/2008 | Dillaway et al. |
| 2008/0086442 A1 | 4/2008 | Dasdan et al. |
| 2008/0091503 A1 | 4/2008 | Schirmer et al. |
| 2008/0133474 A1 | 6/2008 | Hsiao et al. |
| 2008/0172715 A1 | 7/2008 | Geiger et al. |
| 2008/0208813 A1 | 8/2008 | Friedlander et al. |
| 2008/0208838 A1 | 8/2008 | Friedlander et al. |
| 2008/0208901 A1 | 8/2008 | Friedlander et al. |
| 2008/0281801 A1 | 11/2008 | Larson et al. |
| 2008/0306926 A1 | 12/2008 | Friedlander et al. |
| 2009/0024553 A1 | 1/2009 | Angell et al. |
| 2009/0064300 A1 | 3/2009 | Bagepalli et al. |
| 2009/0125546 A1 | 5/2009 | Iborra et al. |
| 2009/0144609 A1 | 6/2009 | Liang et al. |
| 2009/0164649 A1 | 6/2009 | Kawato |
| 2009/0165110 A1 | 6/2009 | Becker et al. |
| 2009/0287676 A1 | 11/2009 | Dasdan |
| 2009/0299988 A1 | 12/2009 | Hamilton, II et al. |
| 2009/0327632 A1 | 12/2009 | Glaizel et al. |
| 2010/0070640 A1 | 3/2010 | Allen et al. |
| 2010/0088322 A1 | 4/2010 | Chowdhury et al. |
| 2010/0131293 A1 | 5/2010 | Linthicum et al. |
| 2010/0179933 A1 | 7/2010 | Bai et al. |
| 2010/0191743 A1 | 7/2010 | Perronnin et al. |
| 2010/0191747 A1 | 7/2010 | Ji et al. |
| 2010/0241644 A1 | 9/2010 | Jackson et al. |
| 2010/0257198 A1 | 10/2010 | Cohen et al. |
| 2010/0274785 A1 | 10/2010 | Procopiuc et al. |
| 2011/0040724 A1 | 2/2011 | Dircz |
| 2011/0066649 A1 | 3/2011 | Berlyant et al. |
| 2011/0077048 A1 | 3/2011 | Busch |
| 2011/0087678 A1 | 4/2011 | Frieden et al. |
| 2011/0123087 A1 | 5/2011 | Nie et al. |
| 2011/0137882 A1 | 6/2011 | Weerasinghe |
| 2011/0194744 A1 | 8/2011 | Wang et al. |
| 2011/0208688 A1 | 8/2011 | Ivanov et al. |
| 2011/0246483 A1 | 10/2011 | Darr et al. |
| 2011/0246498 A1 | 10/2011 | Forster |
| 2011/0252045 A1* | 10/2011 | Garg et al. .................. 707/750 |
| 2011/0282888 A1 | 11/2011 | Koperski et al. |
| 2011/0301967 A1 | 12/2011 | Friedlander et al. |
| 2011/0314155 A1 | 12/2011 | Narayanaswamy et al. |
| 2012/0004891 A1 | 1/2012 | Rameau et al. |
| 2012/0016715 A1 | 1/2012 | Brown et al. |
| 2012/0023141 A1 | 1/2012 | Holster |
| 2012/0072468 A1 | 3/2012 | Anthony et al. |
| 2012/0079493 A1 | 3/2012 | Friedlander et al. |
| 2012/0110004 A1 | 5/2012 | Meijer |
| 2012/0131139 A1 | 5/2012 | Siripurapu et al. |
| 2012/0131468 A1 | 5/2012 | Friedlander et al. |
| 2012/0166373 A1 | 6/2012 | Sweeney et al. |
| 2012/0191704 A1 | 7/2012 | Jones |
| 2012/0209858 A1 | 8/2012 | Lamba et al. |
| 2012/0221439 A1 | 8/2012 | Sundaresan et al. |
| 2012/0233194 A1 | 9/2012 | Ohyu et al. |
| 2012/0239761 A1 | 9/2012 | Linner et al. |
| 2012/0240080 A1 | 9/2012 | O'Malley |
| 2012/0246148 A1 | 9/2012 | Dror |
| 2012/0259841 A1 | 10/2012 | Hsiao et al. |
| 2012/0278897 A1 | 11/2012 | Ang et al. |
| 2012/0281830 A1 | 11/2012 | Stewart et al. |
| 2012/0290950 A1 | 11/2012 | Rapaport et al. |
| 2012/0297278 A1 | 11/2012 | Gattani et al. |
| 2012/0311587 A1 | 12/2012 | Li et al. |
| 2012/0316821 A1 | 12/2012 | Levermore et al. |
| 2012/0330958 A1 | 12/2012 | Xu et al. |
| 2013/0019084 A1 | 1/2013 | Orchard et al. |
| 2013/0031302 A1 | 1/2013 | Byom et al. |
| 2013/0060696 A1 | 3/2013 | Martin et al. |
| 2013/0103389 A1 | 4/2013 | Gattani et al. |
| 2013/0124564 A1 | 5/2013 | Oztekin et al. |

(56) References Cited

U.S. PATENT DOCUMENTS

| | | |
|---|---|---|
| 2013/0173292 A1 | 7/2013 | Friedlander et al. |
| 2013/0173585 A1 | 7/2013 | Friedlander et al. |
| 2013/0191392 A1* | 7/2013 | Kumar et al. ............ 707/737 |
| 2013/0238667 A1 | 9/2013 | Carvalho et al. |
| 2013/0291098 A1 | 10/2013 | Chung et al. |
| 2013/0331473 A1 | 11/2013 | Safovich et al. |
| 2013/0326412 A1 | 12/2013 | Treiser |
| 2013/0339379 A1 | 12/2013 | Ferrari et al. |
| 2014/0012884 A1 | 1/2014 | Bornea et al. |
| 2014/0025702 A1 | 1/2014 | Curtiss et al. |
| 2014/0074833 A1 | 3/2014 | Adams et al. |
| 2014/0074885 A1 | 3/2014 | Adams et al. |
| 2014/0074886 A1* | 3/2014 | Medelyan et al. ......... 707/777 |
| 2014/0074892 A1 | 3/2014 | Adams et al. |
| 2014/0081939 A1 | 3/2014 | Adams et al. |
| 2014/0214865 A1 | 7/2014 | Adams et al. |
| 2014/0214871 A1 | 7/2014 | Adams et al. |
| 2014/0250111 A1 | 9/2014 | Morton et al. |

FOREIGN PATENT DOCUMENTS

| | | |
|---|---|---|
| WO | 2006086179 A2 | 8/2006 |
| WO | 2007044763 A2 | 4/2007 |

OTHER PUBLICATIONS

"The American Heritage College Dictionary", Fourth Edition, Houghton Mifflin Company, 2004, pp. 44 and 262.

U.S. Appl. No. 13/680,832—Non-Final Office Action Mailed Apr. 8, 2014.

U.S. Appl. No. 13/628,853—Notice of Allowance Mailed Mar. 4, 2014.

U.S. Appl. No. 13/540,267—Non-Final Office Action Mailed Feb. 4, 2014.

U.S. Appl. No. 13/540,230—Non-Final Office Action Mailed Jan. 30, 2014.

U.S. Appl. No. 13/540,295—Non-Final Office Action Mailed Jan. 30, 2014.

U.S. Appl. No. 13/609,710—Non-Final Office Action Mailed Jan. 27, 2014.

U.S. Appl. No. 13/342,406—Notice of Allowance Mailed Mar. 20, 2014.

U.S. Appl. No. 13/628,853—Non-Final Office Action Mailed Nov. 7, 2013.

U.S. Appl. No. 13/593,905—Notice of Allowance Mailed Oct. 25, 2013.

U.S. Appl. No. 13/595,356—Non-Final Office Action Mailed Apr. 14, 2014.

U.S. Appl. No. 13/770,025—Specification and Drawings filed Feb. 19, 2013.

U.S. Appl. No. 13/852,288—Specification and Drawings filed Mar. 29, 2013.

U.S. Appl. No. 13/342,406—Non-Final Office Action Mailed Sep. 27, 2013.

U.S. Appl. No. 13/610,347—Non-Final Office Action Mailed Jul. 19, 2013.

U.S. Appl. No. 13/610,347—Notice of Allowance Mailed Aug. 19, 2013.

U.S. Appl. No. 13/592,905—Non-Final Office Action Mailed May 8, 2013.

J. Cheng et al., "Context-Aware Object Connection Discovery in Large Graphs", Data Engineering, 2009. ICDE '09. IEEE 25th International Conference on, pp. 856-867.

R. Angles et al., "Survey of Graph Database Models", ACM Computing Surveys, vol. 40, No. 1, Article 1, Feb. 2008, pp. 1-65.

U.S. Appl. No. 13/562,714, Robert R. Friedlander, et al.—Specification and Drawings filed Jul. 31, 2012.

M.J. Flynn, et al., "Sparse Distributed Memory Principles of Operation", Research Institute for Advanced Computer Science, 1989, pp. 1-60.

P. Kanerva, "Hyperdimensional Computing: An Introduction to Computing in Distributed Representation With High-Dimensional Random Vectors", Springer Science+Business Media, LLC, COGN Comput, 1, 2009, pp. 139-159.

P. Kanerva, "What We Mean When We Say "What's the Dollar of Mexico?": Prototypes and Mapping in Concept Space", Quantum Informatics for Cognitive, Social, and Semantic Processes: Papers From the AAAI Fall Symposium, Association for the Advancement of Artificial Intelligence, 2010, pp. 2-6.

M. Yu, et al., "Secure and Robust Error Correction for Physical Unclonable Functions", Verifying Physical Trustworthiness of ICS and Systems, IEEE Design & Test of Computers, IEEE, Jan./Feb. 2010, pp. 48-64.

A. Jin, et al., "Biohashing: Two Factor Authentication Featuring Fingerprint Data and Tokenised Random Number," Pattern Recognition 37, Elsevier Ltd., 2004, pp. 2245-2255.

N. Saxena et al., "Data remanence effects on memory-based entropy collection for RFID systems", International Journal of Information Security 10.4 (2011), pp. 213-222.

A. Birrell et al., "A design for high-performance flash disks." ACM SIGOPS Operating Systems Review 41.2 (2007), pp. 88-93.

Richard Saling, "How to Give a Great Presentation! From the HP Learning Center", Jul. 28, 2008, <http://rsaling.wordpress.com/2008/07/28/how-to-give-a-great-presentation/>, pp. 1-28.

K. Matterhorn, "How to Share Data Between a Host Computer & Virtual Machine," EHOW, pp. 1-3, <http://www.ehow.com/how_7385388_share-host-computer-virtual-machine.html>, Retrieved Feb. 17, 2013.

U.S. Appl. No. 13/755,623—Notice of Allowance Mailed May 27, 2014.

S. Alam et al., "Interoperability of Security-Enabled Internet of Things", Springer, Wireless Personal Communications, Dec. 2011, vol. 61, pp. 567-586.

U.S. Appl. No. 13/648,801—Non-Final Office Action Mailed Jul. 1, 2014.

U.S. Appl. No. 13/609,710—Final Office Action Mailed Jul. 24, 2014.

U.S. Appl. No. 13/733,052—Non-Final Office Action mailed Sep. 18, 2014.

Faulkner, Paul, "Common Patterns for Synthetic Events in Websphere Business Events," January 15, 2011, http://www.ibm.com/developerworks/websphere/bpmjournal/1101_faulkner2/1101_faulkner2.html, pp. 1-6.

Evaggelio Pitoura et al., "Context in Databases", University of Ioannina, Greece, 2004, pp. 1-19.

Avinash Kaushik, "End of Dumb Tables in Web Analytics Tools! Hello: Weighted Sort", Sep. 7, 2010, www.kaushik.net, pp. 1-15.

Lorenzo Alberton, "Graphs in the Database: SQL Meets Social Networks," Techportal, Sep. 7, 2009, http://techportal.inviqa.com/2009/09/07/graphs-in-the-database-sql-meets-social-networks/, pp. 1-11.

Visual Paradigm, "DB Visual Architect 4.0 Designer's Guide: Chapter 6—Mapping Object Model to Data Model and Vice Versa", 2007, pp. 6-2-6-26.

"Fraud Detection Using Data Analytics in the Banking Industry," ACL Services Ltd., 2010, pp. 1-9 <http://www.acl.com/pdfs/DP_Fraud_detection_BANKING_.pdf>.

W. Caid et al., "Context Vector-Based Text Retrieval", Fair ISAAC Corporation, Aug. 2003, pp. 1-20.

U.S. Appl. No. 13/861,058—Non-Final Office Action mailed Dec. 11, 2014.

S. Ceri et al., "Model-Driven Development of Context-Aware Web Applications", ACM, ACM Transactions on Internet Technology, 2007, (Abstract Only).

U.S. Appl. No. 13/648,801—Final Office Action mailed Jan. 13, 2015.

G. Begelman et al., "Automated Tag Clustering: Improving Search and Exploration in the TagSpace", Collaborative Tagging Workshop, WWW2006, Edinburgh, Scotland, May 2006, pp. 1-29.

U.S. Appl. No. 13/621,931—Non-Final Office Action mailed Jan. 28, 2015.

U.S. Appl. No. 13/732,567—Non-Final Office Action mailed Jan. 30, 2015.

(56) References Cited

OTHER PUBLICATIONS

U.S. Appl. No. 14/078,135—Notice of Allowance mailed Feb. 24, 2015.
U.S. Appl. No. 13/756,051—Notice of Allowance mailed Feb. 27, 2015.
U.S. Appl. No. 13/732,567—Non-Final Office Action mailed Mar. 26, 2015.
L. Du et al., "A Unified Object-Oriented Toolkit for Discrete Contextual Computer Vision", IEEE, IEEE Colloquium on Pattern Recognition, Feb. 1997, pp. 3/1- 3/5. (Abstract Only).

* cited by examiner

GENERATION OF SYNTHETIC CONTEXT FRAMEWORKS FOR DIMENSIONALLY CONSTRAINED HIERARCHICAL SYNTHETIC CONTEXT-BASED OBJECTS

BACKGROUND

The present disclosure relates to the field of computers, and specifically to the use of databases in computers. Still more particularly, the present disclosure relates to a context-based database.

A database is a collection of data. Examples of database types include relational databases, graph databases, network databases, and object-oriented databases. Each type of database presents data in a non-dynamic manner, in which the data is statically stored.

SUMMARY

A processor-implemented method, system, and/or computer program product derives and utilizes a context object to generate a synthetic context-based object. A context object for a non-contextual data object is derived by contextually searching a document that contains multiple instances of the non-contextual data object. The non-contextual data object is associated with the derived context object to define a synthetic context-based object, where the non-contextual data object ambiguously relates to multiple subject-matters, and where the context object provides a context that identifies a specific subject-matter, from the multiple subject-matters, of the non-contextual data object. The synthetic context-based object is then associated with at least one specific data store, which includes data that is associated with data contained in the non-contextual data object and the context object. A dimensionally constrained hierarchical synthetic context-based object library for multiple synthetic context-based objects is then constructed for handling requests for data stores.

DETAILED DESCRIPTION

Figure 1:
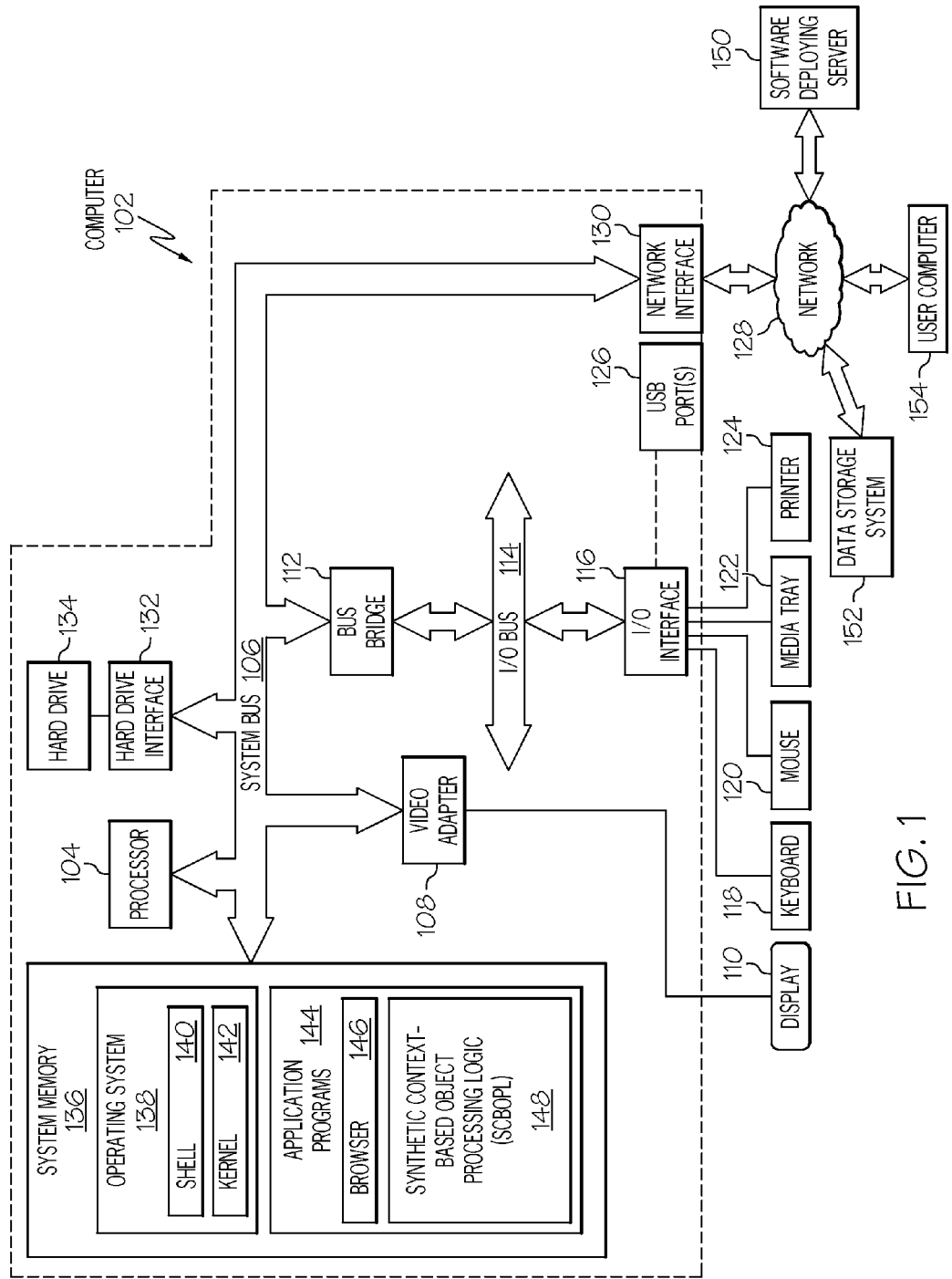
FIG. 1 depicts an exemplary system and network in which the present disclosure may be implemented.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

In one embodiment, instructions are stored on a computer readable storage device (e.g., a CD-ROM), which does not include propagation media.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

With reference now to the figures, and in particular to FIG. 1, there is depicted a block diagram of an exemplary system and network that may be utilized by and in the implementation of the present invention. Note that some or all of the exemplary architecture, including both depicted hardware and software, shown for and within computer 102 may be utilized by software deploying server 150, a data storage system 152, and/or a user computer 154.

Exemplary computer 102 includes a processor 104 that is coupled to a system bus 106. Processor 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multimedia interfaces, etc.), a printer 124, and external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150, using a network interface 130. Network interface 130 is a hardware network interface, such as a network interface card (NIC), etc. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems.

Application programs 144 in computer 102's system memory (as well as software deploying server 150's system memory) also include a synthetic context-based object library logic (SCBOPL) 148. SCBOPL 148 includes code for implementing the processes described below, including those described in FIGS. 2-11. In one embodiment, computer 102 is able to download SCBOPL 148 from software deploying server 150, including in an on-demand basis, wherein the code in SCBOPL 148 is not downloaded until needed for execution. Note further that, in one embodiment of the present invention, software deploying server 150 performs all of the functions associated with the present invention (including execution of SCBOPL 148), thus freeing computer 102 from having to use its own internal computing resources to execute SCBOPL 148.

Figure 6:
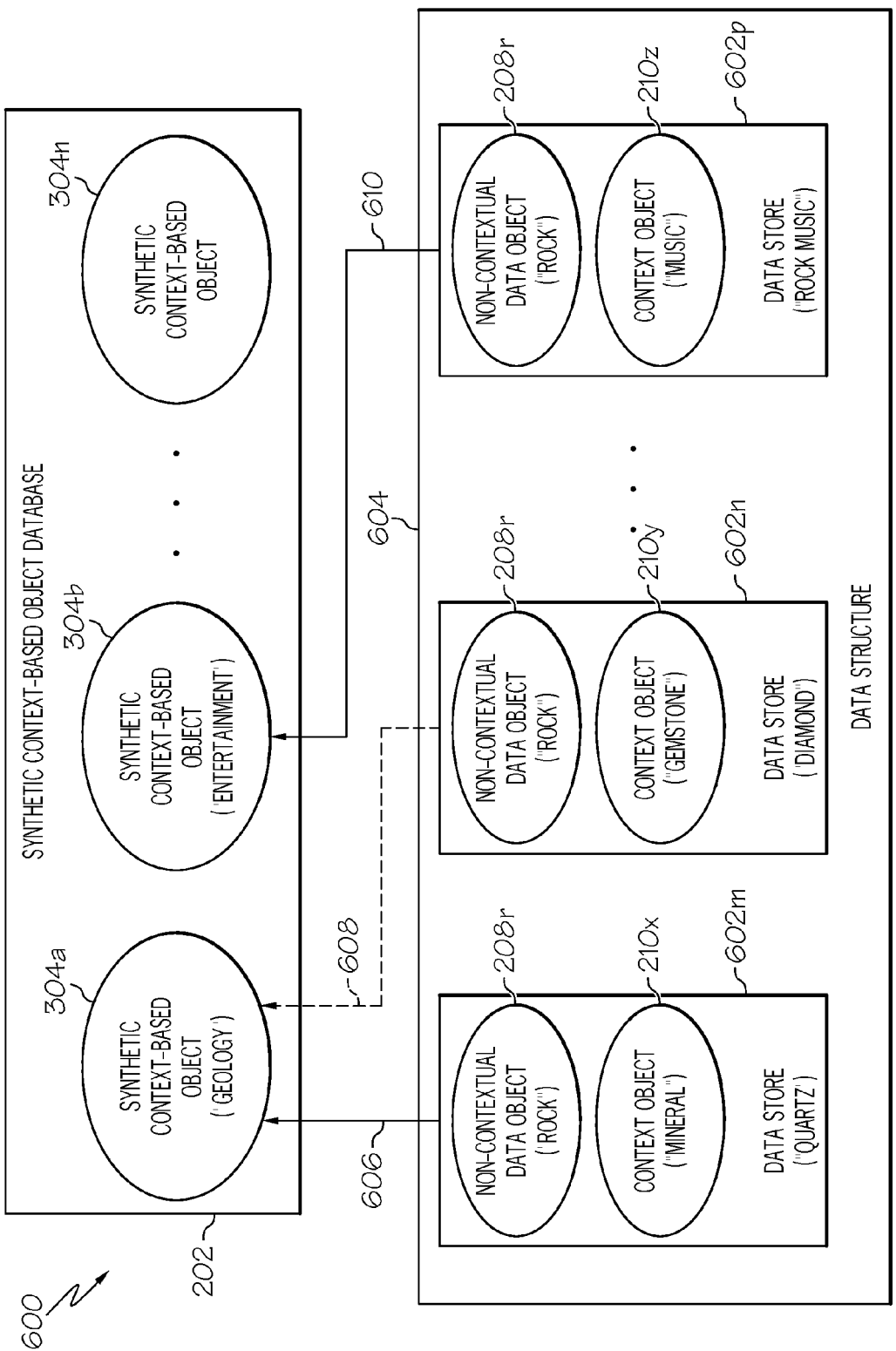
FIG. 6 illustrates a process for associating one or more data stores with specific synthetic context-based objects.
Figure 9:
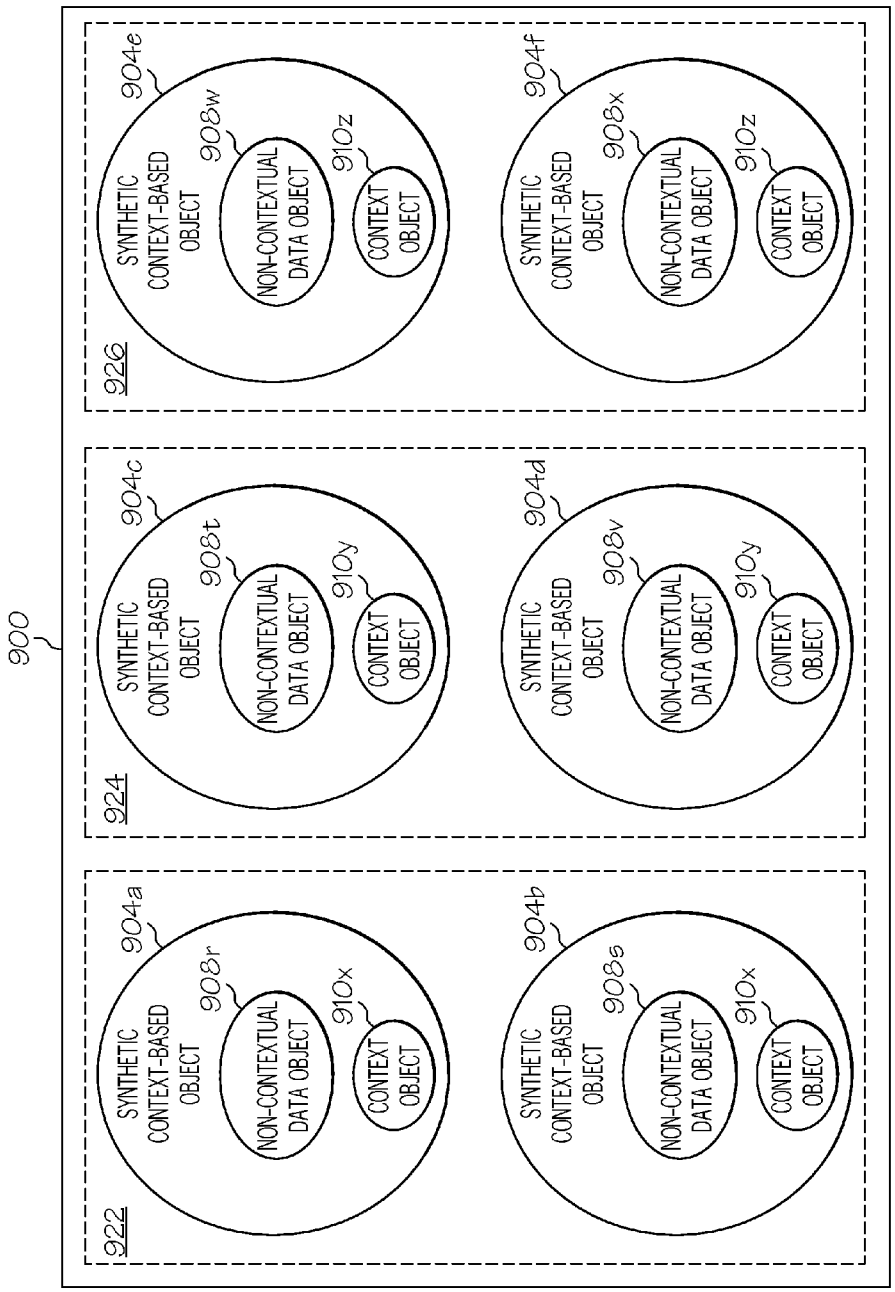
FIG. 9 depicts a vertically-constrained hierarchical synthetic context-based object database.
Figure 11:
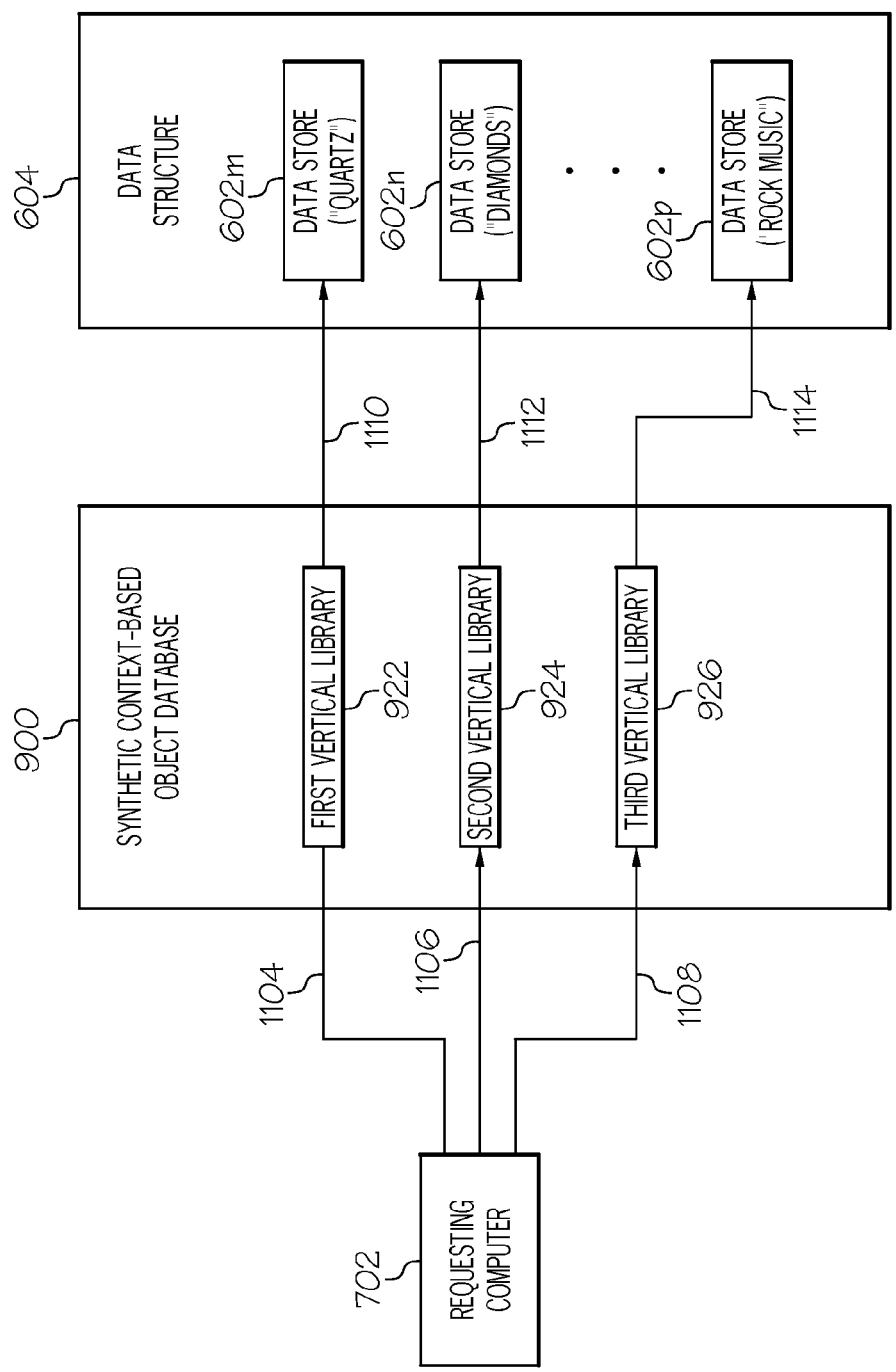
FIG. 11 illustrates a process for locating a particular data store via a user-selected synthetic context-based object library.

The data storage system 152 stores an electronic data structure, which may be audio files, video files, website content, text files, etc. In one embodiment, computer 102 contains the synthetic context-based object database described herein, while data storage system 152 contains the non-contextual data object database, context object database, and data structure described herein. For example, in one embodiment, synthetic context-based object database 202 depicted in FIG. 2 and/or the synthetic context-based object database 900 depicted in FIG. 9 and FIG. 11 is stored in a synthetic context-based object database storage system, which is part of the hard drive 134 and/or system memory 136 of computer 102 and/or data storage system 152; non-contextual data object database 206 depicted in FIG. 2 is stored in a non-contextual data object database storage system, which is part of the hard drive 134 and/or system memory 136 of computer 102 and/or data storage system 152; context object database 212 depicted in FIG. 2 is stored in a context object database storage system, which is part of the hard drive 134 and/or system memory 136 of computer 102 and/or data storage system 152; and data structure 602 depicted in FIG. 6 is stored in a data structure storage system, which is part of the hard drive 134 and/or system memory 136 of computer 102 and/or data storage system 152.

Note that the hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

Note that SCBOPL 148 is able to generate and/or utilize some or all of the databases depicted in the context-based system referenced in FIGS. 2-11.

Figure 2:
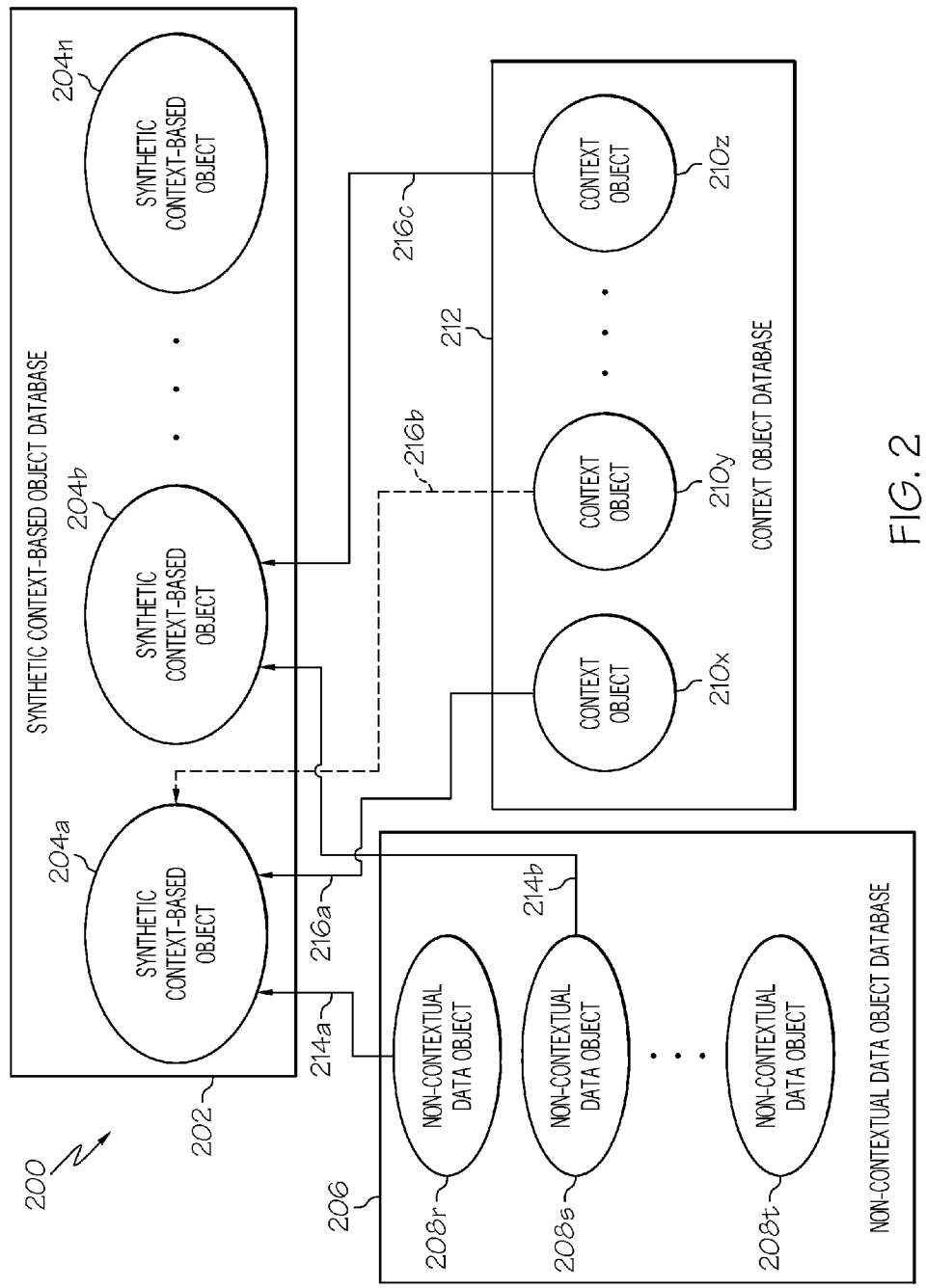
FIG. 2 illustrates a process for generating one or more synthetic context-based objects.

With reference now to FIG. 2, a process for generating one or more synthetic context-based objects in a system 200 is presented. Note that system 200 is a processing and storage logic found in computer 102 and/or data storage system 152 shown in FIG. 1, which process, support, and/or contain the databases, pointers, and objects depicted in FIG. 2.

Within system 200 is a synthetic context-based object database 202, which contains multiple synthetic context-based objects 204a-204n (thus indicating an "n" quantity of objects, where "n" is an integer). Each of the synthetic context-based objects 204a-204n is defined by at least one non-contextual data object and at least one context object. That is, at least one non-contextual data object is associated with at least one context object to define one or more of the synthetic context-based objects 204a-204n. The non-contextual data object ambiguously relates to multiple subject-matters, and the context object provides a context that identifies a specific subject-matter, from the multiple subject-matters, of the non-contextual data object.

Note that the data in the context objects are not merely attributes or descriptors of the data/objects described by the non-contextual data objects. Rather, the context objects provide additional information about the non-contextual data objects in order to give these non-contextual data objects meaning. Thus, the context objects do not merely describe something, but rather they define what something is. Without the context objects, the non-contextual data objects contain data that is meaningless; with the context objects, the non-contextual data objects become meaningful.

For example, assume that a non-contextual data object database 206 includes multiple non-contextual data objects 208r-208t (thus indicating a "t" quantity of objects, where "t" is an integer). However, data within each of these non-contextual data objects 208r-208t by itself is ambiguous, since it has no context. That is, the data within each of the non-contextual data objects 208r-208t is data that, standing alone, has no meaning, and thus is ambiguous with regards to its subject-matter. In order to give the data within each of the non-contextual data objects 208r-208t meaning, they are given context, which is provided by data contained within one or more of the context objects 210x-210z (thus indicating a "z" quantity of objects, where "z" is an integer) stored within a context object database 212. For example, if a pointer 214a points the non-contextual data object 208r to the synthetic context-based object 204a, while a pointer 216a points the context object 210x to the synthetic context-based object 204a, thus associating the non-contextual data object 208r and the context object 210x with the synthetic context-based object 204a (e.g., storing or otherwise associating the data within the non-contextual data object 208r and the context object 210x in the synthetic context-based object 204a), the data within the non-contextual data object 208r now has been given unambiguous meaning by the data within the context object 210x. This contextual meaning is thus stored within (or otherwise associated with) the synthetic context-based object 204a.

Similarly, if a pointer 214b associates data within the non-contextual data object 208s with the synthetic context-based object 204b, while the pointer 216c associates data within the context object 210z with the synthetic context-based object 204b, then the data within the non-contextual data object 208s is now given meaning by the data in the context object 210z. This contextual meaning is thus stored within (or otherwise associated with) the synthetic context-based object 204b.

Note that more than one context object can give meaning to a particular non-contextual data object. For example, both context object 210x and context object 210y can point to the synthetic context-based object 204a, thus providing compound context meaning to the non-contextual data object 208r shown in FIG. 2. This compound context meaning provides various layers of context to the data in the non-contextual data object 208r.

Note also that while the pointers 214a-214b and 216a-216c are logically shown pointing towards one or more of the synthetic context-based objects 204a-204n, in one embodiment the synthetic context-based objects 204a-204n actually point to the non-contextual data objects 208r-208t and the context objects 210x-210z. That is, in one embodiment the synthetic context-based objects 204a-204n locate the non-contextual data objects 208r-208t and the context objects 210x-210z through the use of the pointers 214a-214b and 216a-216c.

Figure 3:
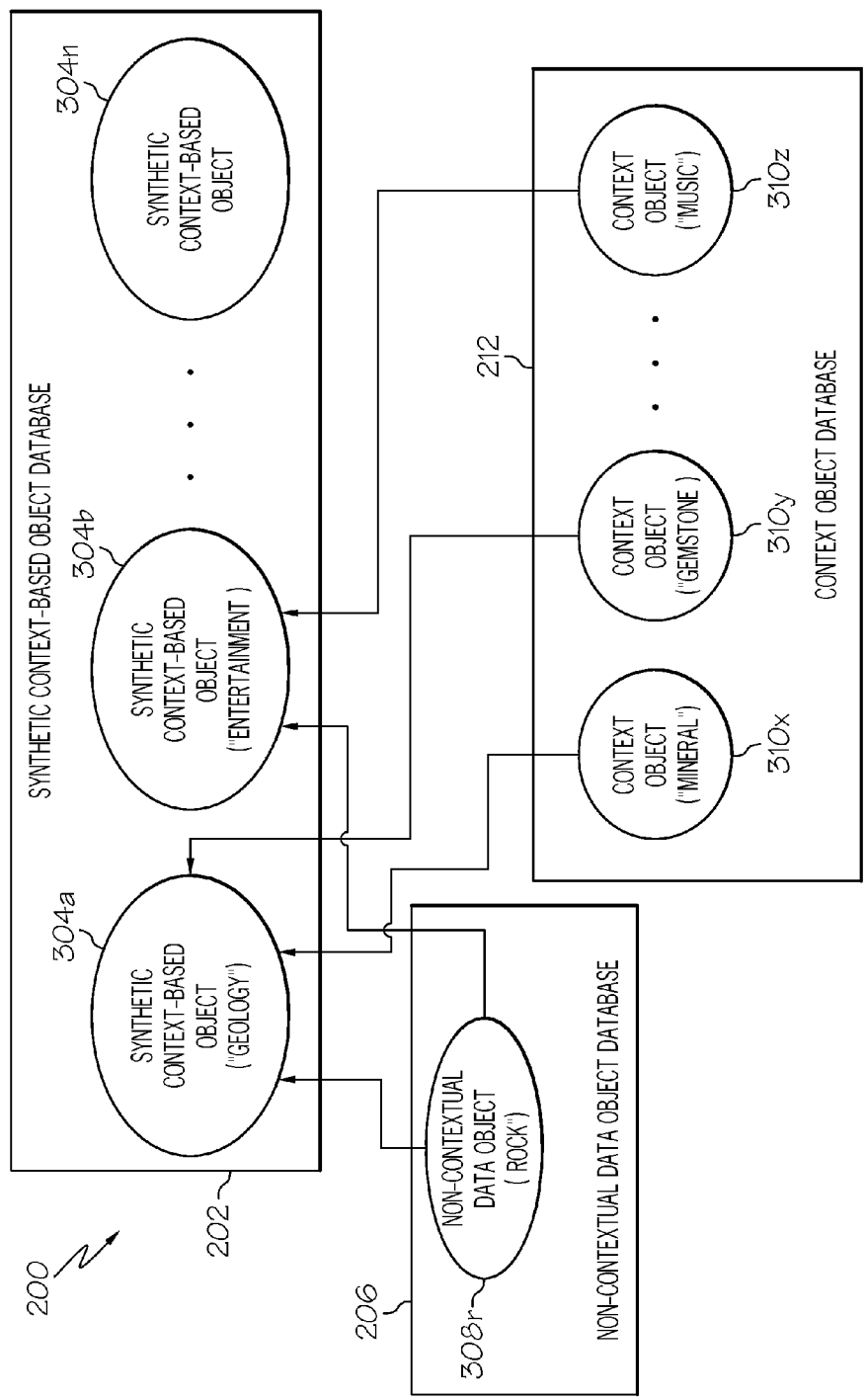
FIG. 3 depicts an exemplary case in which synthetic context-based objects are defined for the non-contextual data object datum "Rock"

Consider now an exemplary case depicted in FIG. 3, in which synthetic context-based objects are defined for the non-contextual data object data "Rock". Standing alone, without any context, the word "rock" is meaningless, since it is ambiguous and does not provide a reference to any particular subject-matter. That is, "rock" may refer to a stone, or it may be slang for a gemstone such as a diamond, or it may refer to a genre of music, or it may refer to physical oscillation, etc. Thus, each of these references is within the context of a different subject-matter (e.g., geology, entertainment, physics, etc.).

In the example shown in FIG. 3, then, data (i.e., the word "rock") from the non-contextual data object 308r is associated with (e.g., stored in or associated by a look-up table, etc.) a synthetic context-based object 304a, which is devoted to the subject-matter "geology". The data/word "rock" from non-contextual data object 308r is also associated with a synthetic context-based object 304b, which is devoted to the subject-matter "entertainment". In order to give contextual meaning to the word "rock" (i.e., define the term "rock") in the context of "geology", context object 310x, which contains the context datum "mineral" is associated with (e.g., stored in or associated by a look-up table, etc.) the synthetic context-based object 304a. In one embodiment, more than one context datum can be associated with a single synthetic context-based object. Thus, in the example shown in FIG. 3, the context object 310*y*, which contains the datum "gemstone", is also associated with the synthetic context-based object 304*a*.

Associated with the synthetic context-based object 304*b* is a context object 310*z*, which provides the context/datum of "music" to the term "rock" provided by the non-contextual data object 308*r*. Thus, the synthetic context-based object 304*a* defines "rock" as that which is related to the subject-matter "geology", including minerals and/or gemstones, while synthetic context-based object 304*b* defines "rock" as that which is related to the subject-matter "entertainment", including music.

In one embodiment, the data within a non-contextual data object is even more meaningless if it is merely a combinations of numbers and/or letters. For example, consider the data "104-106" contained within a non-contextual data object 408*r* depicted in FIG. 4. Standing alone, without any context, these numbers are meaningless, identify no particular subject-matter, and thus are completely ambiguous. That is, "104-106" may relate to subject-matter such as a medical condition, a physics value, a person's age, a quantity of currency, an person's identification number, etc. That is, the data "104-106" is so vague/meaningless that the data does not even identify the units that the term describes, much less the context of these units.

Figure 4:
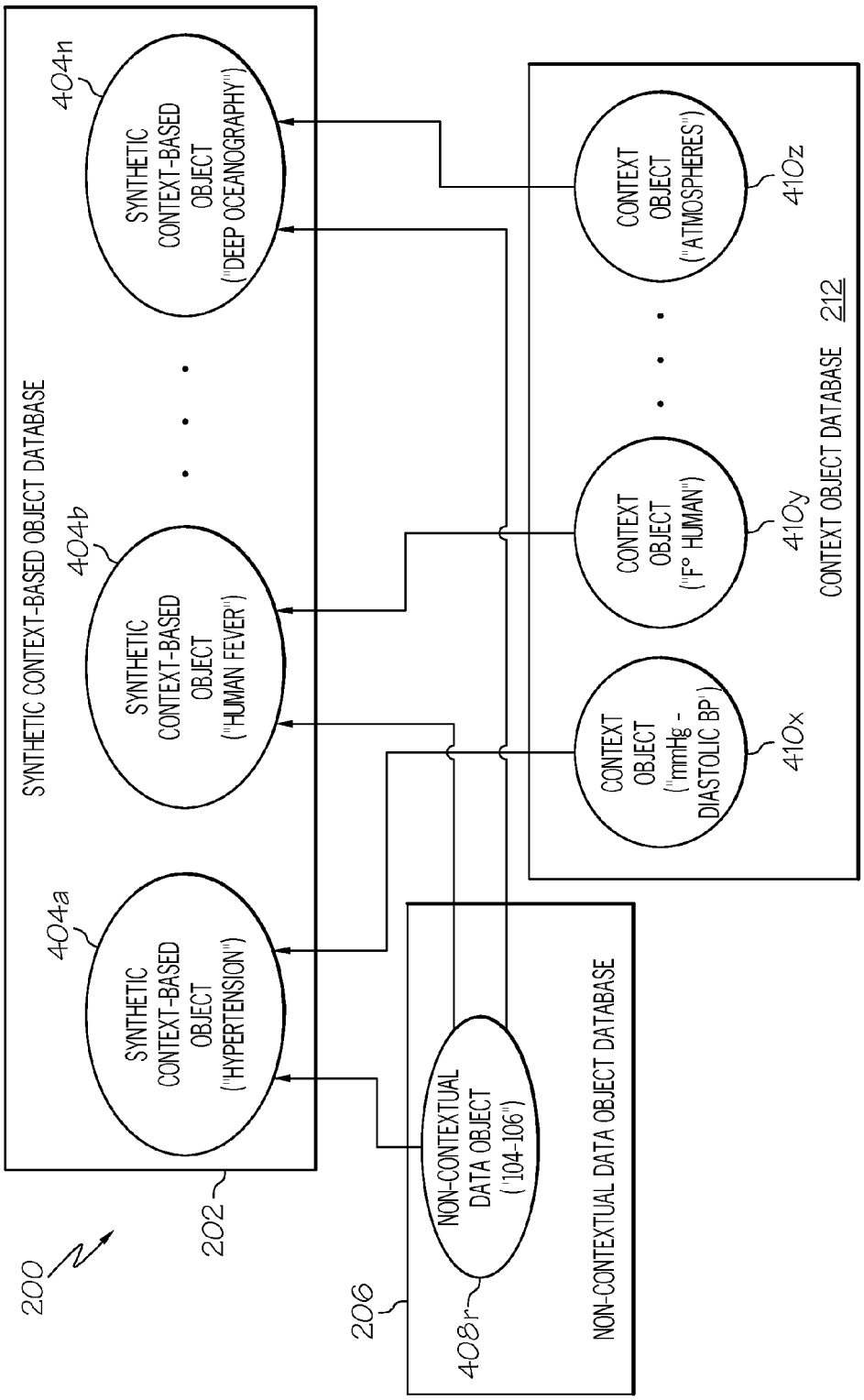
FIG. 4 illustrates an exemplary case in which synthetic context-based objects are defined for the non-contextual data object data "104-106"
Figure 5:
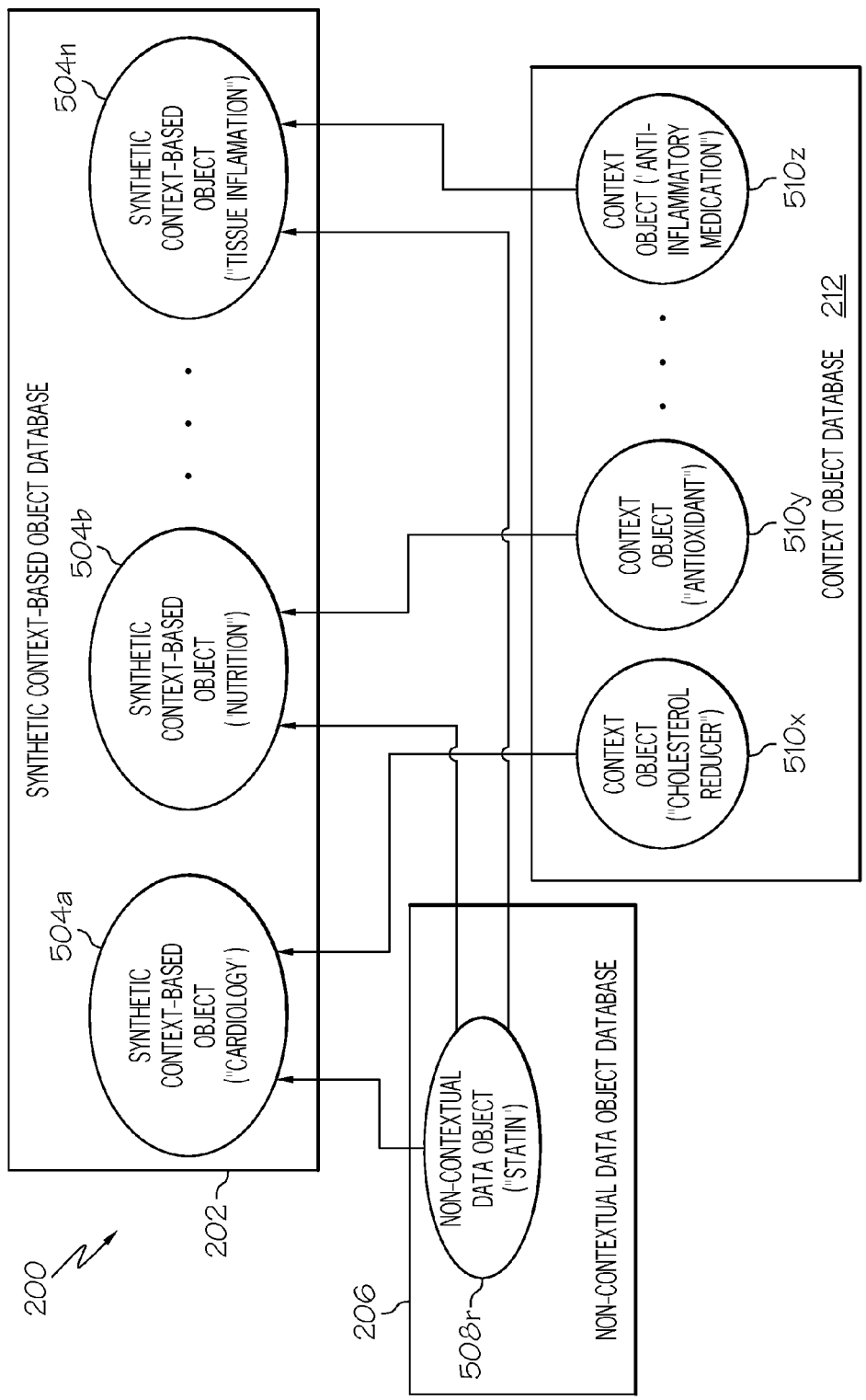
FIG. 5 depicts an exemplary case in which synthetic context-based objects are defined for the non-contextual data object datum "Statin"

In the example shown in FIG. 4, then, data (i.e., the term/values "104-106") from the non-contextual data object 408*r* is associated with (e.g., stored in or associated by a look-up table, etc.) a synthetic context-based object 404*a*, which is devoted to the subject-matter "hypertension". The term/values "104-106" from non-contextual data object 408*r* is also associated with a synthetic context-based object 404*b*, which is devoted to the subject-matter "human fever" and a synthetic context-based object 404*n*, which is devoted to the subject-matter "deep oceanography". In order to give contextual meaning to the term/values "104-106" (i.e., define the term/values "104-106") in the context of "hypertension", context object 410*x*, which contains the context data "millimeters of mercury" and "diastolic blood pressure" is associated with (e.g., stored in or associated by a look-up table, etc.) the synthetic context-based object 404*a*. Thus, multiple data can provide not only the scale/units (millimeters of mercury) context of the values "104-106", but the data can also provide the context data "diastolic blood pressure" needed to identify the subject-matter (hypertension) of the synthetic context-based object 404*a*.

Associated with the synthetic context-based object 404*b* is a context object 410*y*, which provides the context/data of "degrees on the Fahrenheit scale" and "human" to the term/values "104-106" provided by the non-contextual data object 408*r*. Thus, the synthetic context-based object 404*b* now defines term/values "104-106" as that which is related to the subject matter of "human fever". Similarly, associated with the synthetic context-based object 404*n* is a context object 410*z*, which provides the context/data of "deep oceanography" to the term/values "104-106" provided by the non-contextual data object 408*r*. In this case, the generator of the synthetic context-based object database 202 determines that high numbers of atmospheres are used to define deep ocean pressures. Thus, the synthetic context-based object 404*n* now defines term/values "104-106" as that which is related to the subject matter of deep oceanography.

In one embodiment, the non-contextual data object may provide enough self-context to identify what the datum is, but not what it means and/or is used for. For example, consider the datum "statin" contained within the non-contextual data object 508*r* shown in FIG. 5. In the example shown in FIG. 5, datum (i.e., the term "statin") from the non-contextual data object 508*r* is associated with (e.g., stored in or associated by a look-up table, etc.) a synthetic context-based object 504*a*, which is devoted to the subject-matter "cardiology". The term "statin" from non-contextual data object 508*r* is also associated with a synthetic context-based object 504*b*, which is devoted to the subject-matter "nutrition" and a synthetic context-based object 504*n*, which is devoted to the subject-matter "tissue inflammation". In order to give contextual meaning to the term "statin" (i.e., define the term "statin") in the context of "cardiology", context object 510*x*, which contains the context data "cholesterol reducer" is associated with (e.g., stored in or associated by a look-up table, etc.) the synthetic context-based object 504*a*. Thus, the datum "cholesterol reducer" from context object 510*x* provides the context to understand that "statin" is used in the context of the subject-matter "cardiology".

Associated with the synthetic context-based object 504*b* is a context object 510*y*, which provides the context/datum of "antioxidant" to the term "statin" provided by the non-contextual data object 508*r*. That is, a statin has properties both as a cholesterol reducer as well as an antioxidant. Thus, a statin can be considered in the context of reducing cholesterol (i.e., as described by the subject-matter of synthetic context-based object 504*a*), or it may considered in the context of being an antioxidant (i.e., as related to the subject-matter of synthetic context-based object 504*b*). Similarly, a statin can also be an anti-inflammatory medicine. Thus, associated with the synthetic context-based object 504*b* is a context object 510*y*, which provides the context/data of "antioxidant" to the term "statin" provided by the non-contextual data object 508*r*. This combination identifies the subject-matter of the synthetic context-based object 504*b* as "tissue inflammation". Similarly, associated with the synthetic context-based object 504*n* is the context object 510*z*, which provides the context/data of "anti-inflammatory medication" to the term "statin" provided by the non-contextual data object 508*r*. This combination identifies the subject-matter of the synthetic context-based object 504*n* as "tissue inflammation".

Once the synthetic context-based objects are defined, they can be linked to data stores. A data store is defined as a data repository of a set of integrated data, such as text files, video files, webpages, etc. With reference now to FIG. 6, a process for associating one or more data stores with specific synthetic context-based objects in a system 600 is presented. Note that system 600 is a processing and storage logic found in computer 102 and/or data storage system 152 shown in FIG. 1, which process, support, and/or contain the databases, pointers, and objects depicted in FIG. 6. The data structure 604 is a database of multiple data stores 602*m*-602*p* (thus indicating an "p" number of data stores, where "p" is an integer), which may be text documents, hierarchical files, tuples, object oriented database stores, spreadsheet cells, uniform resource locators (URLs), etc.

That is, in one embodiment, the data structure 604 is a database of text documents (represented by one or more of the data stores 602*m*-602*p*), such as journal articles, webpage articles, electronically-stored business/medical/operational notes, etc.

In one embodiment, the data structure 604 is a database of text, audio, video, multimedia, etc. files (represented by one or more of the data stores 602*m*-602*p*) that are stored in a hierarchical manner, such as in a tree diagram, a lightweight directory access protocol (LDAP) folder, etc.

In one embodiment, the data structure 604 is a relational database, which is a collection of data items organized through a set of formally described tables. A table is made up of one or more rows, known as "tuples". Each of the tuples (represented by one or more of the data stores 602m-602p) share common attributes, which in the table are described by column headings. Each tuple also includes a key, which may be a primary key or a foreign key. A primary key is an identifier (e.g., a letter, number, symbol, etc.) that is stored in a first data cell of a local tuple. A foreign key is typically identical to the primary key, except that it is stored in a first data cell of a remote tuple, thus allowing the local tuple to be logically linked to the foreign tuple.

In one embodiment, the data structure 604 is an object oriented database, which stores objects (represented by one or more of the data stores 602m-602p). As understood by those skilled in the art of computer software, an object contains both attributes, which are data (i.e., integers, strings, real numbers, references to another object, etc.), as well as methods, which are similar to procedures/functions, and which define the behavior of the object. Thus, the object oriented database contains both executable code and data.

In one embodiment, the data structure 604 is a spreadsheet, which is made up of rows and columns of cells (represented by one or more of the data stores 602m-602p). Each cell (represented by one or more of the data stores 602m-602p) contains numeric or text data, or a formula to calculate a value based on the content of one or more of the other cells in the spreadsheet.

In one embodiment, the data structure 604 is a collection of universal resource locators (URLs) for identifying a webpage, in which each URL (or a collection of URLs) is represented by one or more of the data stores 602m-602p.

These described types of data stores are exemplary, and are not to be construed as limiting what types of data stores are found within data structure 604.

Note that the data structure 604 is homogenous in one embodiment, while data structure 604 is heterogeneous in another embodiment. For example, assume in a first example that data structure 604 is a relational database, and all of the data stores 602m-602p are tuples. In this first example, data structure 604 is homogenous, since all of the data stores 602m-602p are of the same type. However, assume in a second example that data store 602m is a text document, data store 602m is an MRI image, data store 602p is a tuple from a relational database, etc. In this second example, data structure 604 is a heterogeneous data structure, since it contains data stores that are of different formats.

FIG. 6 thus represents various data stores being "laid over" one or more of the synthetic context-based objects 304a-304n described above in FIG. 3. That is, one or more of the data stores 602m-602p is mapped to a particular synthetic context-based object from the synthetic context-based objects 304a-304n, in order to facilitate exploring/searching the data structure 604. For example, a pointer 606 (e.g., an identifier located within both synthetic context-based object 304a and data store 602m) points the data store 602m to the synthetic context-based object 304a, based on the fact that the data store 602m contains data found in the non-contextual data object 208r and the context object 210x, which together gave the subject-matter meaning to the synthetic context-based object 304a as described above. Similarly, pointer 608 points data store 602n to synthetic context-based object 304a as well, provided that synthetic context based object 304a also contains data from context object 210y, as described in an alternate embodiment above. Similarly, pointer 610 points data store 602p to synthetic context-based object 304b, since data store 602p and synthetic context-based object 304b both contain data from the non-contextual data object 208r as well as the context object 210z.

Figure 7:
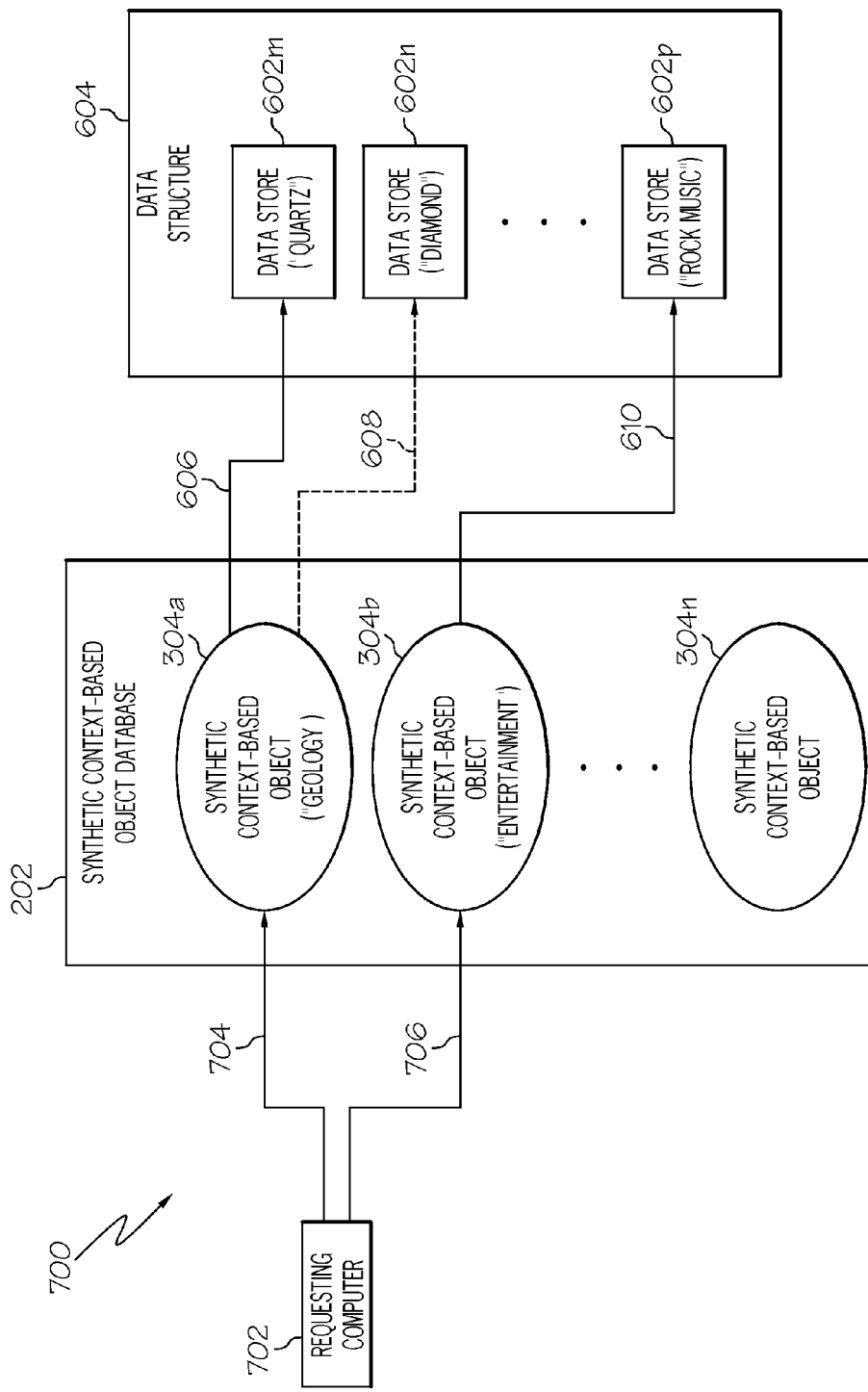
FIG. 7 depicts a process for locating a particular data store via a user-selected synthetic context-based object.
Figure 8:
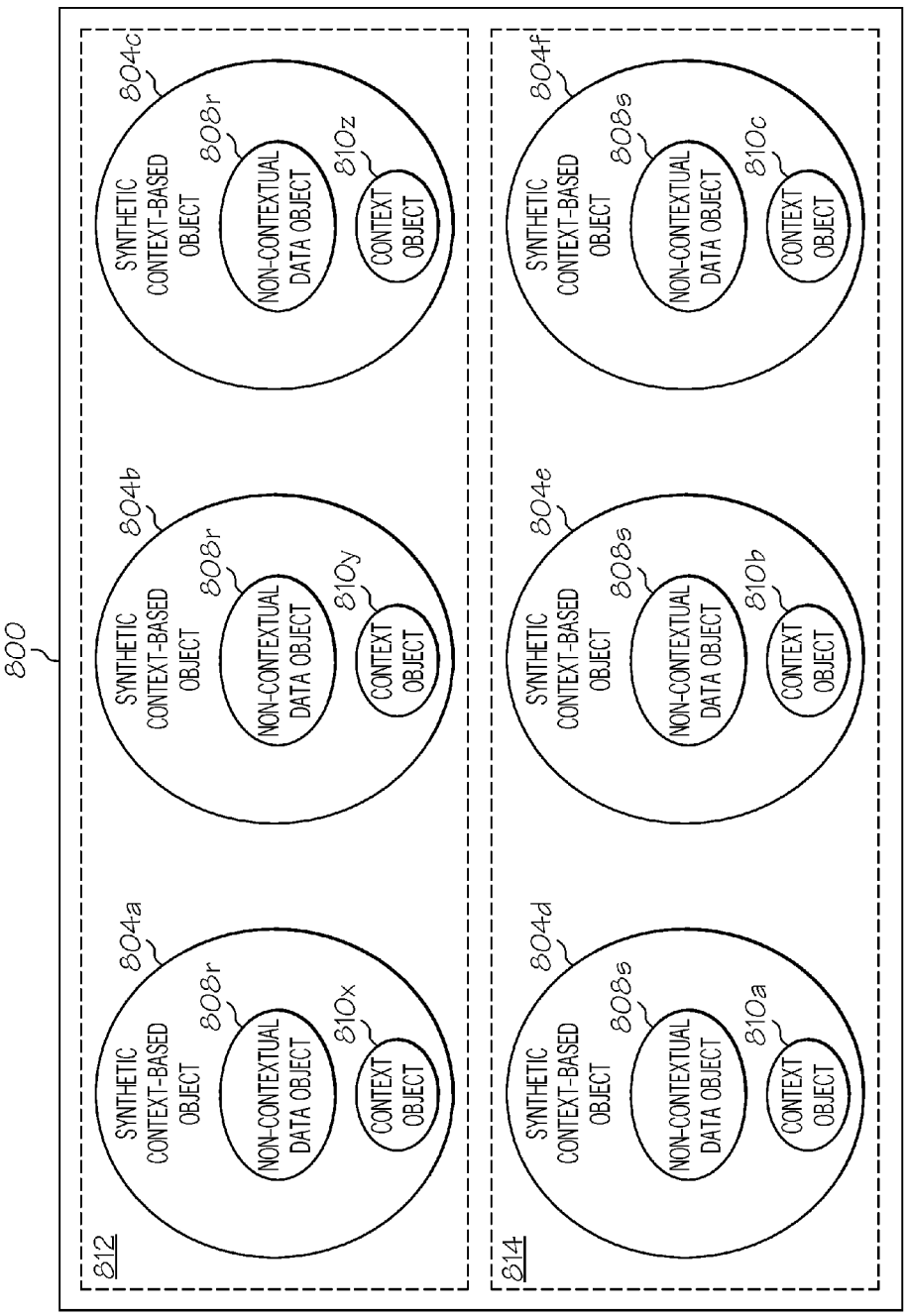
FIG. 8 illustrates a horizontally constrained library of synthetic context-based objects according to non-contextual data objects.

As described in FIG. 6, the pointers enable various data stores to be associated with specific subject-matter-specific synthetic context based objects. This association facilitates searching the data structure 604 according to the subject-matter, which is defined by the combination of data from the non-contextual data object and the context object, of a particular synthetic context-based object. Thus, as depicted in FIG. 7, an exemplary process for locating a particular data store via a particular synthetic context-based object is presented.

Assume that a user is using a computer such as requesting computer 702, which may be the user computer 154 shown in FIG. 1. The requesting computer 702 sends a request 704 to synthetic context-based object 304a if the user desires information about geological rocks (i.e., the subject-matter of geology). The user can specify this particular context-based object 304a by manually choosing it from a displayed selection of synthetic context-based objects, or logic (e.g., part of SCBOPL 148 shown in FIG. 1) can determine which synthetic context-based object and/or subject-matter are appropriate for a particular user, based on that user's interests, job description, job title, etc. The synthetic context-based object then uses pointer 606 to point to data store 602m and/or pointer 608 to point to data store 602, and returns the data stored within these data stores to the requesting computer 702. Thus, the user/requesting system does not have to perform a search of all of the data structure 604, using data mining and associative logic, in order to find the data that the user desires. Rather, making an association between the user and a particular synthetic context-based object provides a rapid gateway from the requesting computer 702 to the desired data store.

Similarly, if the requester sends a request 706 to the synthetic context-based object 304b, then data from the data store 602p regarding rock music is retrieved and sent to the requester 702.

Note that in one embodiment of the present invention, a library of synthetic context-based objects is constructed to facilitate the user of the synthetic context-based objects when searching a data structure. In one embodiment, this library is horizontally constrained, such that synthetic context-based objects within a same dimension are placed within a same library. For example, consider the synthetic context-based object database 800 depicted in FIG. 8. Within a first horizontal library 812 are synthetic context-based objects 804a-804c. Each of these synthetic context-based objects 804a-804c contains a same non-contextual data object 808r, but they have different context objects 810x-810z, as depicted. Within a second horizontal library 814 are synthetic context-based objects 804d-804f. Each of these synthetic context-based objects 804d-804f contain a same non-contextual data object 808s, but they have different context objects 810a-810c, which may the same or different context objects as context objects 810x-810z.

The synthetic context-based object database 900 depicted in FIG. 9 depicts libraries that are organized according to the context objects, rather than the non-contextual data objects. That is, a first vertical library 922 contains synthetic context-based objects 904a-904c. Each of these synthetic context-based objects 904a-904c contains different non-contextual data objects 908r and 908s, but they have the same context object 910x, as depicted. Within a second vertical library 924 are synthetic context-based objects 904c-904d, which contain different non-contextual data object 908t and 908v, but they have the same context object 910y. Similarly, within a third vertical library 926 are synthetic context-based objects 904e-904f, which contain different non-contextual data object 908w and 908x, but they have the same context object 910x.

Thus, it is the presence of the same non-contextual data object in a synthetic context-based object that defines the horizontal library, while it is the presence of the same context object in a synthetic context-based object that defines the vertical library.

Figure 10:
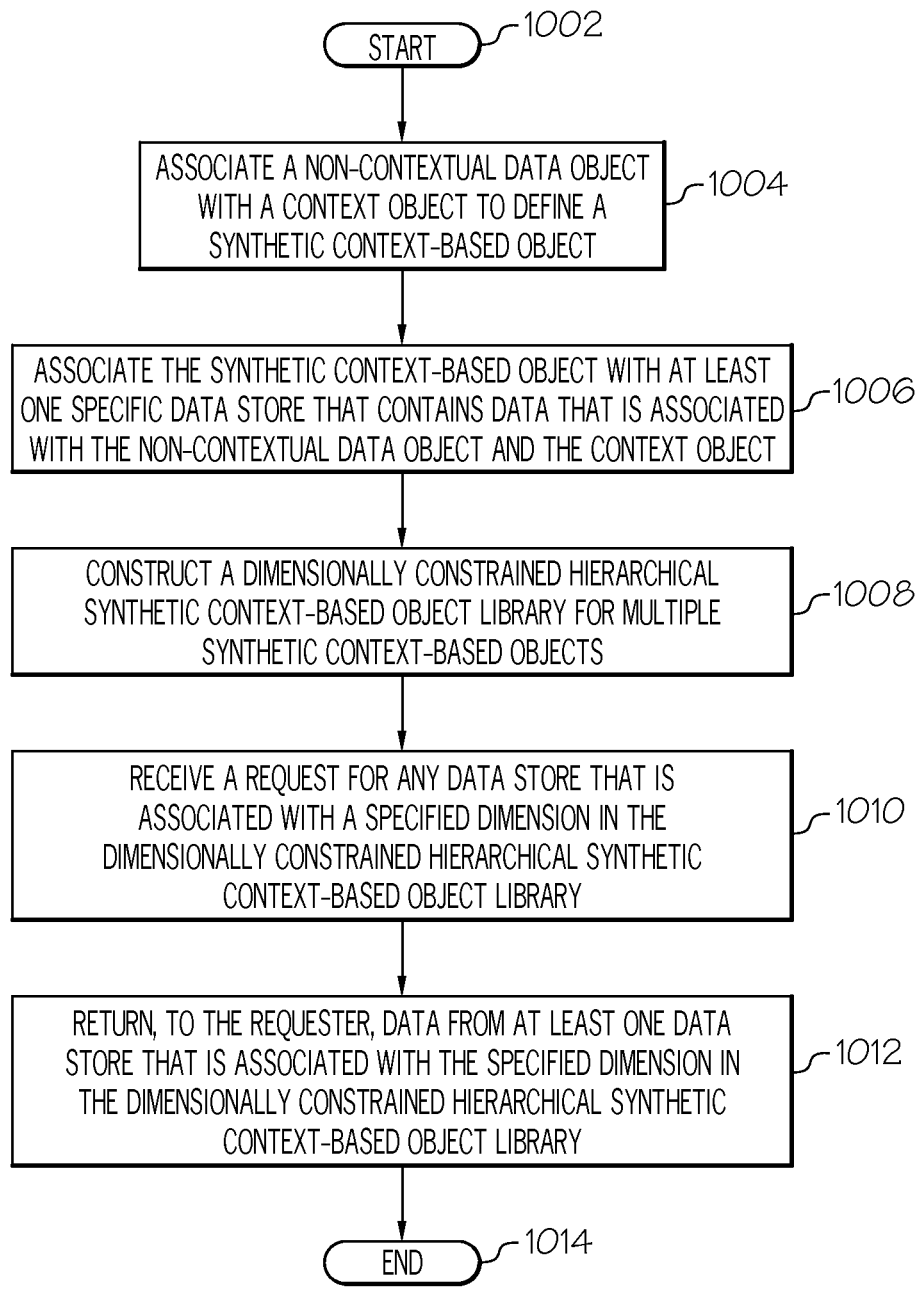
FIG. 10 is a high-level flow chart of one or more steps performed by a computer processor to generate and utilize a dimensionally constrained hierarchical synthetic context-based object database.

With reference now to FIG. 10, a high-level flow chart of one or more steps performed by a computer processor to generate and utilize synthetic context-based objects to locate and/or return specific data stores to a requester is presented. After initiator block 1002, a non-contextual data object is associated with a context object to define a synthetic context-based object (block 1004). As described herein, the non-contextual data object ambiguously relates to multiple subject-matters. Standing alone, it is unclear to which of these multiple-subject matters the data in the non-contextual data object is directed. However, the context object provides a context that identifies a specific subject-matter, from the multiple subject-matters, of the non-contextual data object.

As described in block 1006, the synthetic context-based object is associated with at least one specific data store. This at least one specific data store contains data that is associated with data contained in the non-contextual data object and the context object. That is, the data in the data store may be identical to that found in the non-contextual data object and the context object (i.e., the terms "rock" and "mineral" are in both the data store as well as the respective non-contextual data object and context object); it may be synonymous to that found in the non-contextual data object and the context object (i.e., the terms "rock" and "mineral" are the respective non-contextual data object and context object while synonyms "stone" and "element" are in the data store); and/or it may simply be deemed related by virtue of a lookup table that has been previously created (i.e., the term "rock" is mapped to the term "stone" and/or the term "mineral" is mapped to the term "elements" in a lookup table or similar associative data structure).

In one embodiment, the terms in the data store are identified by data mining a data structure in order to locate the data from the non-contextual data object and the context object in one or more data stores. Thus, this data mining locates at least one specific data store that contains data contained in the non-contextual data object and the context object.

In one embodiment, the data store is a text document. In this embodiment, the data mining entails searching the text document for text data that is part of the synthetic context-based object, and then associating the text document that contains this text data with the synthetic context-based object.

In one embodiment, the data store is a video file. In this embodiment, the data mining entails searching metadata associated with the video file for text data that is part of the synthetic context-based object, and then associating the video file having this metadata with the synthetic context-based object.

In one embodiment, the data store is a web page. In this embodiment, the data mining entails searching the web page for text data that is part of the synthetic context-based object, and then associating the web page that contains this text data with the synthetic context-based object.

Note that in one embodiment, the specific subject-matter for a particular data store in the data structure is exclusive to only that particular data store. That is, only one data store is mapped to a particular synthetic context-based object, such that there is a one-to-one relationship between each synthetic context-based object and each data store. Note further that in another embodiment, the specific subject-matter for a particular data store in the data structure overlaps at least one other data store. That is, multiple data stores are mapped to a particular synthetic context-based object, such that there is a one-to-many relationship between a particular synthetic context-based object and multiple data stores.

With reference now to block 1008, a dimensionally constrained hierarchical synthetic context-based object library for multiple synthetic context-based objects is then constructed, where synthetic context-based objects within a same dimension of the dimensionally constrained hierarchical synthetic context-based object library share data. If the shared data is from a same non-contextual data object, then the dimensionally constrained hierarchical synthetic context-based object library is a horizontal library, in which synthetic context-based objects within the same horizontal dimension of the dimensionally constrained hierarchical synthetic context-based object library contain disparate data from different context objects. If the shared data is from a same context object, then the dimensionally constrained hierarchical synthetic context-based object library is a vertical library, in which synthetic context-based objects within the same vertical dimension of the dimensionally constrained hierarchical synthetic context-based object library contain disparate data from different non-contextual data objects.

With reference now to block 1010, a request for at least one data store that is associated with synthetic context-based objects within the same dimension of the dimensionally constrained hierarchical synthetic context-based object library is then received (e.g., by computer 102 shown in FIG. 1). In one embodiment, this request is received from the requester via a request pointer, which points to a specific synthetic context-based object. In one embodiment, this specific synthetic context-based object is user-selected and/or user-specified (i.e., the user either manually chooses which synthetic context-based object is to be used, or this choice is made by processing logic based on characteristics of the requesting user). For example, consider the process depicted in FIG. 11.

The requesting computer 702 sends a request 1104 to the first vertical library 922 described in FIG. 9, rather than to the synthetic context-based object 304a described in FIG. 7. This first vertical library 922 contains only synthetic context-based objects that share a same context object 910x (as shown in FIG. 9). Assuming that data within context object 910x refers to "minerals", then pointer 1110 points from the first vertical library 922 to the data store 602m, which has data about "quartz". Similarly, the second vertical library 924 contains only synthetic context-based objects that share a same context object 910y (as shown in FIG. 9). Assuming that data within context object 910y refers to "gemstones", then pointer 1112 points from the second vertical library 924 to the data store 602n, which has data about "diamonds". Finally, the third vertical library 926 contains only synthetic context-based objects that share a same context object 910z (as shown in FIG. 9). Assuming that data within context object 910z refers to "music", then pointer 1114 points from the third vertical library 926 to the data store 602p, which has data about "rock music". In one embodiment, the user can specify a particular vertical library by manually choosing it from a displayed selection of vertical objects, or logic (e.g., part of SCBOPL 148 shown in FIG. 1) can determine which vertical and/or subject-matter/context are appropriate for a particular user, based on that user's interests, job description, job title, etc.

As described in block 1012, at least one specific data store that is associated with synthetic context-based objects within the same dimension of the dimensionally constrained hierarchical synthetic context-based object library are then returned to the requester. In one embodiment, pointers similar to (or the same as) pointers 1110, 1112, and 1114 are used to return the data in these data stores to the requesting computer. Thus, the user/requesting system does not have to perform a search of all of the data structure 604, using data mining and associative logic, in order to find the data that the user desires. Rather, making an association between the user and a particular vertical library of synthetic context-based objects provides a rapid gateway from the requesting computer 702 to the desired data store.

The process ends at terminator block 1014.

Figure 12:
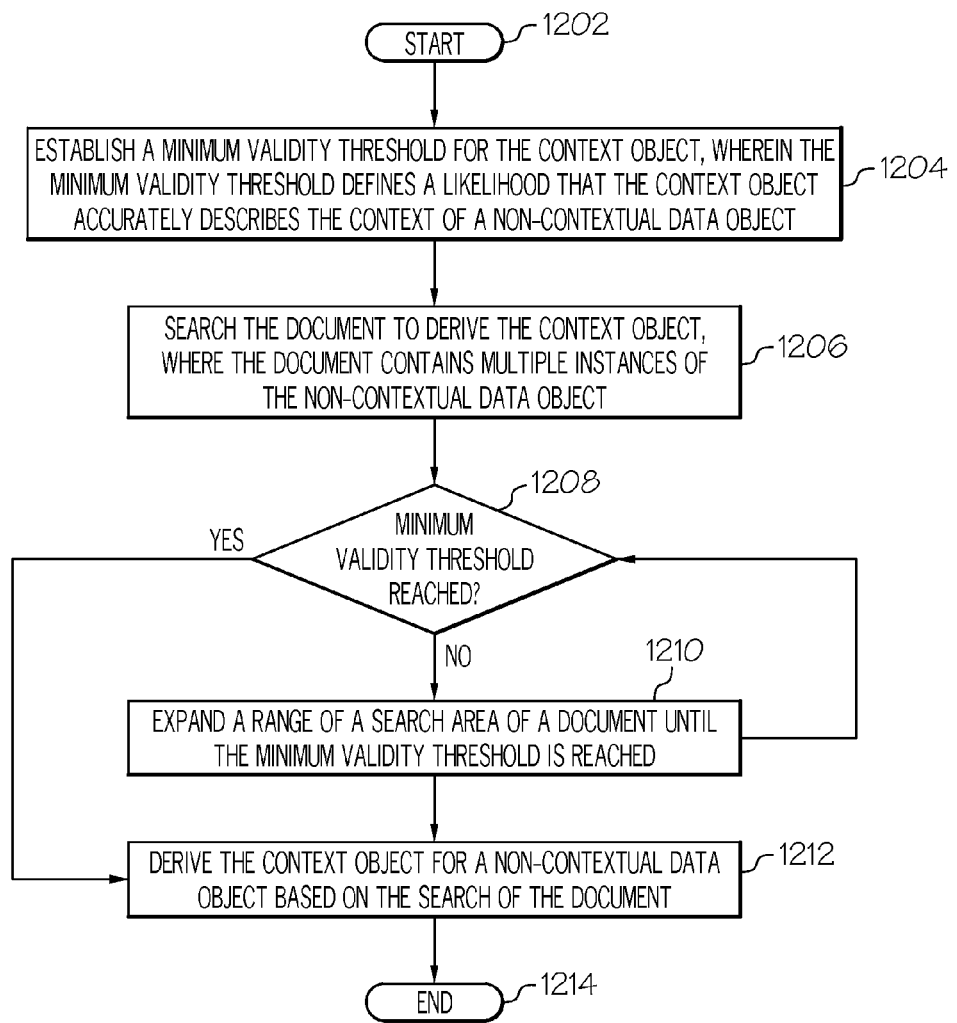
FIG. 12 is a high-level flow chart of one or more steps performed by a computer processor to derive the context objects used by the present disclosure.

As described herein, the present process utilizes one or more context objects. An exemplary process, executed by a processor, for deriving the requisite context objects is presented in FIG. 12. After initiator block 1202, a minimum validity threshold for the context object is established (block 1204). This minimum validity threshold defines a probability that a set of one or more context objects accurately describes the context of a particular non-contextual data object. As described in block 1206, a document, which contains multiple instances of this particular non-contextual data object, is then searched and analyzed in order to determine the context of this non-contextual data object. For example, assume that context object 410$y$ shown in FIG. 4 has an 80% probability of accurately defining the context of "104-106" as being a that of an abnormally high human oral temperature, based on a contextual search and analysis of a single paragraph from a book. However, if the minimum validity threshold is 95% (see query block 1208), then the rest of a page from the book is further searched/analyzed (block 1210). If this minimum validity threshold is still not reached, then a full chapter, or perhaps even the entire book, is contextually searched and analyzed in order to reach the minimum validity threshold (block 1212). The process ends at terminator block 1214.

In one embodiment, two context objects within a document may be deemed similarly appropriate for one non-contextual data object. A search/analysis of the document may reveal enough instances of both a first context object and a second context object to satisfy the minimum validity threshold for assigning a context object to a non-contextual data object to create an appropriate synthetic context-based object. In this embodiment, the processor may assign a correct context object to the non-contextual data object based on which context object (of the first and second context objects) appears most often in the document (i.e., which context object is used more frequently). The context object with the greater number of instances of use in the document is therefore determined to be the correct context object to define a synthetic context-based object based on a particular non-contextual data object.

Alternatively, in one embodiment, if two context objects are determined to both meet the minimum validity threshold for defining a single non-contextual data object, the processor may determine that both or neither of the resulting synthetic context-based objects are appropriate. That is, rather than requiring that a single context object be chosen as the correct context object for a particular non-contextual data object, both context objects that meet the minimum validity threshold are assigned to that particular non-contextual data object by the processor. In another embodiment, the processor may instead determine that neither context object is the correct context object for that particular non-contextual data object (despite both context objects meeting the minimum validity threshold) and require that a third context object, that better meets the minimum validity threshold requirements, be searched for, in order to create a synthetic context-based object that more accurately describes the context of the data.

In one embodiment, the search/analysis of the document (i.e., a text document, video file, audio file, etc.) is performed by contextually examining the data proximate to the non-contextual data object within the document. For example, assume that the non-contextual data object is "3.14". Within one paragraph, "3.14" is used as part of a math formula. Therefore, "3.14" is initially assumed to be relevant to calculating the area or circumference of a circle. However, in another paragraph within the document, "3.14" is used to describe a price of a stock. Additional instances of "3.14" are also used within passages related to business investments and finance. Thus, the original assumption that "3.14" describes a number used to calculate the area or circumference of a circle was incorrect. However, if the minimum validity threshold were low enough (e.g., 50%), then a context object of "circle area" or "circle circumference" would likely be assigned to "3.14". However, if the minimum validity threshold were higher (e.g., 95%), then the single association of "3.14" with a math formula would not reach this level, thus requiring that the scope of search of the document be expanded, such that the proper context object (i.e., "stock price") is derived.

Note that if the document is a video or audio file, the document is searched by first performing audio-to-text conversion, and then searching for the text.

In one embodiment, the expanded search of the document is performed using a Map/Reduce function. Map/Reduce is a data search routine that is used to search for and quantify data located in very large volumes of data. As the name implies, there are two functions in a map/reduce routine. The map function reads data incidents (e.g., each word in a text document) from a set of one or more documents (e.g., text documents, web pages, e-mails, text messages, tweets, etc.), and then maps those data incidents to a set of dynamically generated intermediate pairs (identifier, quantity). These intermediate pairs of mapped data are then sent to a reduce function, which recursively operates on the intermediate pairs to generate a value that indicates how many times each data incident occurred in all of the searched documents.

In one embodiment in which Map/Reduce is used to derive the context object, a progressively higher number of processors are used to execute the evaluations of the subsequently lower-level partitions of the document. For example, assume that a first pass at evaluating a single line in a document uses a single processor. If this first pass does not produce a context object that meets the minimum validity threshold described above, then the full paragraph is evaluated by four processors in a second pass. If this second pass does not produce a context object that meets the minimum validity threshold, then sixteen processors are assigned to evaluate the entire chapter, etc.

In one embodiment, the minimum validity threshold described herein is not for a single context object, but for a set of multiple context objects. For example, assume that context objects 210$x$ and 210$y$ both provide context to non-contextual data object 208$r$ depicted in FIG. 2. In this embodiment, it is the combination of both context objects 210$x$ and 210$y$ that is used to determine if they meet the minimum validity threshold.

In one embodiment, the probability that a set of one or more context objects accurately provides context to a non-contextual data object is historically based. That is, assume that in 95% of past documents, a particular context object has been shown to provide the accurate context (i.e., provides correct meaning) to a particular non-contextual data object if that particular context object is used in proximity to (i.e., within 10 words) that particular non-contextual data object more than three times. Thus, if this particular context object is used more than three times in proximity to this particular non-contextual data object within the current document, then there is an assumption that this particularly context object has a 95% probability (likelihood) of accurately providing the proper context to this particular non-contextual data object.

In one embodiment, the probability that a set of one or more context objects accurately provides context to a non-contextual data object is established using Bayesian probabilities. For example, consider the Bayesian probability formula of:

$$P(CO \mid D) = \frac{P(D \mid CO) * P(CO)}{P(D)}$$

where:
P(CO|D) is a probability that the context object (CO) provides an accurate context to the non-contextual data object given (|) that the context object is within ten words of the non-contextual data object more than a certain number of times (D) in the document;
P(D|CO) is a probability that the context object is within ten words of the non-contextual data object more than a certain number of times in the document whenever the context object provides the accurate context to the non-contextual data object;
P(CO) is a probability that context object provides an accurate context to the non-contextual data object, regardless of any other conditions; and
P(D) is a probability that the non-contextual data object is within ten words of the non-contextual data object more than a certain number of times in the document, regardless of any other conditions.

For example, assume that past evaluations have determined that the probability that the context object is within ten words of the non-contextual data object more than a certain number of times in a paragraph of a book whenever the context object provides the accurate context to the non-contextual data object is 60%; the probability that context object provides an accurate context to the non-contextual data object, regardless of any other conditions, is 5%; and the probability that the non-contextual data object is within ten words of the non-contextual data object more than a certain number of times in the document, regardless of any other conditions, is 10%.

According to these values, the probability that a context objects provide an accurate context to the non-contextual data object given that this context object is within ten words of the non-contextual data object more than a certain number of times in the single paragraph is 3%:

$$P(CO \mid D) = \frac{.60 * .05}{.1} = .3$$

In this first scenario, if the minimum validity threshold is 95%, then there is not enough support to assume that this context object is valid. Thus, a further search for the context object within ten words of the non-contextual data object is made on an entire page/chapter. In this scenario, past evaluations have determined that the probability that the context object is within ten words of the non-contextual data object more than a certain number of times in an entire page/chapter of a book whenever the context object provides the accurate context to the non-contextual data object is 78%; the probability that context object provides an accurate context to the non-contextual data object, regardless of any other conditions, is still 5%; and the probability that the non-contextual data object is within ten words of the non-contextual data object more than a certain number of times in the document, regardless of any other conditions, is now 4%.

According to these values, the probability that a context object provides an accurate context to the non-contextual data object given that this context object is within ten words of the non-contextual data object more than a certain number of times in the entire page/chapter is 98%:

$$P(CO \mid D) = \frac{.78 * .05}{.04} = .98$$

In this second scenario, the additional search/analysis of the entire page or chapter deems this particular context object to accurately provide context to the non-contextual data object.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A method for deriving and utilizing a context object to generate a synthetic context-based object, the method comprising:
deriving, by one or more processors, a context object for a non-contextual data object, wherein the non-contextual data object ambiguously relates to multiple subject-matters, wherein the context object provides a context that identifies a specific subject-matter, from multiple subject-matters, of the non-contextual data object, and wherein the context object is derived by contextually searching and analyzing a document, which contains multiple instances of the non-contextual data object, to derive the context object;
establishing a minimum validity threshold for the context object, wherein the minimum validity threshold defines a probability that a derived context object accurately describes the context of the non-contextual data object;
expanding a range of a search area of the document until the minimum validity threshold is reached;
associating, by one or more processors, the non-contextual data object with the context object to define a synthetic context-based object;
associating, by one or more processors, the synthetic context-based object with at least one specific data store, wherein said at least one specific data store comprises data that is associated with data contained in the non-contextual data object and the context object;
constructing, by one or more processors, a dimensionally constrained hierarchical synthetic context-based object library for multiple synthetic context-based objects, wherein synthetic context-based objects within a same dimension of the dimensionally constrained hierarchical synthetic context-based object library share data from a same non-contextual data object, and wherein synthetic context-based objects within the same dimension of the dimensionally constrained hierarchical synthetic context-based object library contain disparate data from different context objects;
receiving, from a requester, a request for at least one data store that is associated with synthetic context-based objects within the same dimension of the dimensionally constrained hierarchical synthetic context-based object library; and
returning, to the requester, said at least one specific data store that is associated with synthetic context-based objects within the same dimension of the dimensionally constrained hierarchical synthetic context-based object library.

2. The method of claim 1, wherein the document is a text document.

3. The method of claim 1, wherein the document is an audio file.

4. The method of claim 1, wherein the document is a video file.

5. The method of claim 1, further comprising:
executing, by one or more processors, a map/reduce search of the document to reach the minimum validity threshold, wherein the map-reduce search sequentially performs evaluations of subsequently lower-level partitions of the document to determine finer levels of granularity to derive the context object.

6. The method of claim 5, further comprising:
utilizing a progressively higher number of processors to execute the evaluations of the subsequently lower-level partitions of the document.

7. The method of claim 1, further comprising:
determining, by one or more processors, a probability that the context object accurately describes the context of the non-contextual data object through use of a probability formula of:

$$P(CO \mid D) = \frac{P(D \mid CO) * P(CO)}{P(D)}$$

where:
P(CO|D) is a probability that the context object (CO) provides an accurate context to the non-contextual data object given (|) that the context object is within ten words of the non-contextual data object more than a certain number of times (D) in the document;
P(D|CO) is a probability that the context object is within ten words of the non-contextual data object more than a certain number of times in the document whenever the context object provides the accurate context to the non-contextual data object;
P(CO) is a probability that context object provides an accurate context to the non-contextual data object, regardless of any other conditions; and
P(D) is a probability that the non-contextual data object is within ten words of the non-contextual data object more than a certain number of times in the document, regardless of any other conditions.

8. The method of claim 1, wherein the specific subject-matter for a particular data store in the data structure is exclusive to only said particular data store.

9. The method of claim 1, wherein the specific subject-matter for a particular data store in the data structure overlaps a subject-matter of another data store in the data structure.

10. The method of claim 1, wherein the data store is a text document, and wherein the method further comprises:
searching, by one or more processors, the text document for text data that is part of the synthetic context-based object; and
associating, by one or more processors, the text document that contains said text data with the synthetic context-based object.

11. The method of claim 1, wherein the data store is a video file, and wherein the method further comprises:
searching, by one or more processors, metadata associated with the video file for text data that is part of the synthetic context-based object; and associating, by one or more processors, the video file having said metadata with the synthetic context-based object.

12. The method of claim 1, wherein the data store is a web page, and wherein the method further comprises:
searching, by one or more processors, the web page for text data that is part of the synthetic context-based object; and
associating, by one or more processors, the web page that contains said text data with the synthetic context-based object.

13. The method of claim 1, further comprising:
receiving the request from the requester via a request pointer, wherein the request pointer points to a user-specified synthetic context-based object.

14. A computer program product for deriving and utilizing a context object to generate a synthetic context-based object, the computer program product comprising a non-transitory computer readable storage medium having program code embodied therewith, the program code readable and executable by a processor to perform a method comprising:
deriving a context object for a non-contextual data object, wherein the non-contextual data object ambiguously relates to multiple subject-matters, wherein the context object provides a context that identifies a specific subject-matter, from multiple subject-matters, of the non-contextual data object, and wherein the context object is derived by contextually searching and analyzing a document, which contains multiple instances of the non-contextual data object, to derive the context object;
establishing a minimum validity threshold for the context object, wherein the minimum validity threshold defines a probability that a derived context object accurately describes the context of the non-contextual data object;
expanding a range of a search area of the document until the minimum validity threshold is reached;
associating the non-contextual data object with the context object to define a synthetic context-based object;
associating the synthetic context-based object with at least one specific data store, wherein said at least one specific data store comprises data that is associated with data contained in the non-contextual data object and the context object;
constructing a dimensionally constrained hierarchical synthetic context-based object library for multiple synthetic context-based objects, wherein synthetic context-based objects within a same dimension of the dimensionally constrained hierarchical synthetic context-based object library share data from a same non-contextual data object, and wherein synthetic context-based objects within the same dimension of the dimensionally constrained hierarchical synthetic context-based object library contain disparate data from different context objects;
receiving, from a requester, a request for at least one data store that is associated with synthetic context-based objects within the same dimension of the dimensionally constrained hierarchical synthetic context-based object library; and
returning, to the requester, said at least one specific data store that is associated with synthetic context-based objects within the same dimension of the dimensionally constrained hierarchical synthetic context-based object library.

15. The computer program product of claim 14, wherein the program code is further readable and executable by the processor for:

executing a map/reduce search of the document to reach the minimum validity threshold, wherein the map-reduce search sequentially performs evaluations of subsequently lower-level partitions of the document to determine finer levels of granularity to derive the context object; and
utilizing a progressively higher number of processors to execute the evaluations of the subsequently lower-level partitions of the document.

16. The computer program product of claim 14, wherein the document is a video file.

17. The computer program product of claim 14, wherein the program code is further readable and executable by the processor for:
determining a probability that the context object accurately describes the context of the non-contextual data object through use of a probability formula of:

$$P(CO \mid D) = \frac{P(D \mid CO) * P(CO)}{P(D)}$$

where:
P(CO|D) is a probability that the context object (CO) provides an accurate context to the non-contextual data object given (|) that the context object is within ten words of the non-contextual data object more than a certain number of times (D) in the document;
P(D|CO) is a probability that the context object is within ten words of the non-contextual data object more than a certain number of times in the document whenever the context object provides the accurate context to the non-contextual data object;
P(CO) is a probability that context object provides an accurate context to the non-contextual data object, regardless of any other conditions; and
P(D) is a probability that the non-contextual data object is within ten words of the non-contextual data object more than a certain number of times in the document, regardless of any other conditions.

18. A computer system comprising:
a processor, a computer readable memory, and a computer readable storage medium;
first program instructions to derive a context object for a non-contextual data object, wherein the non-contextual data object ambiguously relates to multiple subject-matters, wherein the context object provides a context that identifies a specific subject-matter, from multiple subject-matters, of the non-contextual data object, and wherein the context object is derived by contextually searching and analyzing a document, which contains multiple instances of the non-contextual data object, to derive the context object;
second program instructions to establish a minimum validity threshold for the context object, wherein the minimum validity threshold defines a probability that a set of one or more context objects accurately describes the context of the non-contextual data object; and
third program instructions to expand a range of a search area of the document until the minimum validity threshold is reached;
fourth program instructions to associate the non-contextual data object with the context object to define a synthetic context-based object;
fifth program instructions to associate the synthetic context-based object with at least one specific data store, wherein said at least one specific data store comprises data that is associated with data contained in the non-contextual data object and the context object;

sixth program instructions to construct a dimensionally constrained hierarchical synthetic context-based object library for multiple synthetic context-based objects, wherein synthetic context-based objects within a same dimension of the dimensionally constrained hierarchical synthetic context-based object library share data from a same non-contextual data object, and wherein synthetic context-based objects within the same dimension of the dimensionally constrained hierarchical synthetic context-based object library contain disparate data from different context objects;

seventh program instructions to receive, from a requester, a request for at least one data store that is associated with synthetic context-based objects within the same dimension of the dimensionally constrained hierarchical synthetic context-based object library;

eighth program instructions to return, to the requester, said at least one specific data store that is associated with synthetic context-based objects within the same dimension of the dimensionally constrained hierarchical synthetic context-based object library; and wherein the first, second, third, fourth, fifth, sixth, seventh, and eighth program instructions are stored on the computer readable storage medium for execution by the processor via the computer readable memory.

19. The computer system of claim 18, wherein the document is a video file.

20. The computer system of claim 18, further comprising:
ninth program instructions to execute a map/reduce search of the document to reach the minimum validity threshold, wherein the map-reduce search sequentially performs evaluations of subsequently lower-level partitions of the document to determine finer levels of granularity to derive the context object; and tenth program instructions to utilize a progressively higher number of processors to execute the evaluations of the subsequently lower-level partitions of the document; and wherein the ninth and tenth program instructions are stored on the computer readable storage medium for execution by the processor via the computer readable memory.

\* \* \* \* \*